US008352116B2

(12) United States Patent
Boylston et al.

(10) Patent No.: US 8,352,116 B2
(45) Date of Patent: Jan. 8, 2013

(54) TILT AND/OR ACCELERATION SENSING APPARATUS AND METHOD

(75) Inventors: Clifford H. Boylston, Conyers, GA (US); Arthur James Harvey, Mantua, OH (US); Nicholas Schragal, Chardon, OH (US)

(73) Assignee: Delta Systems, Inc., Streetsboro, OH (US)

( * ) Notice: Subject to any disclaimer, the term of this patent is extended or adjusted under 35 U.S.C. 154(b) by 389 days.

(21) Appl. No.: 12/686,722

(22) Filed: Jan. 13, 2010

(65) Prior Publication Data

US 2010/0191408 A1 Jul. 29, 2010

Related U.S. Application Data

(60) Provisional application No. 61/161,180, filed on Mar. 18, 2009, provisional application No. 61/154,615, filed on Feb. 23, 2009, provisional application No. 61/144,879, filed on Jan. 15, 2009.

(51) Int. Cl.
G05D 3/00 (2006.01)
A01D 75/18 (2006.01)
G06F 9/00 (2006.01)

(52) U.S. Cl. .................. 701/29.1; 701/45; 56/10.2 R

(58) Field of Classification Search .............. 701/29, 701/45, 29.1, 38, 48; 56/10.2 R, 229
See application file for complete search history.

(56) References Cited

U.S. PATENT DOCUMENTS

| 3,702,051 A | 11/1972 | Deines |
| 5,532,672 A | 7/1996 | Plazarin |
| 5,742,228 A | 4/1998 | Levy |
| 5,797,111 A | 8/1998 | Halasz et al. |
| 6,397,133 B1 * | 5/2002 | van der Pol et al. ........... 701/37 |
| 6,535,800 B2 * | 3/2003 | Wallner ........................... 701/1 |
| 6,931,323 B2 * | 8/2005 | Choi et al. ........................ 702/2 |
| 6,983,583 B2 | 1/2006 | Bucher |
| 7,373,801 B2 | 5/2008 | Friedman et al. |

(Continued)

FOREIGN PATENT DOCUMENTS

JP 2005205960 A 8/2005

OTHER PUBLICATIONS

International Search Report (14 pages) for App. EP10150894, mailing date Jun. 30, 2010.

(Continued)

*Primary Examiner* — Tan Q. Nguyen
(74) *Attorney, Agent, or Firm* — Tarolli, Sundheim, Covell & Tummino LLP

(57) ABSTRACT

A tilt or acceleration sensing apparatus and method that allows a tilt or acceleration sensing device of a vehicle to determine: 1) a maximum fall angle of the vehicle, regardless of the orientation of the vehicle and the vehicle's tilt sensor(s) to the incline; or 2) the downward acceleration of the vehicle. In one embodiment, a method of determining a maximum fall angle of a vehicle includes sensing tilt angles of two sensing axes of the vehicle relative to a horizontal reference plane and calculating the maximum fall angle of the vehicle based on the tilt angles. The apparatus and method may also include comparing the maximum fall angle to predetermined values and generating output signals when the maximum fall angle exceeds the predetermined values. In another embodiment, a method of determining when a vehicle is sliding downhill includes sensing the accelerations of three sensing axes.

27 Claims, 13 Drawing Sheets

U.S. PATENT DOCUMENTS

| | | |
|---|---|---|
| 7,641,234 B1 | 1/2010 | Pelnar |
| 7,950,268 B2 | 5/2011 | Friedman et al. |
| 2003/0102178 A1 | 6/2003 | Ide et al. |
| 2005/0004730 A1* | 1/2005 | Suzuki et al. .................. 701/38 |
| 2005/0080544 A1 | 4/2005 | Suzuki et al. |
| 2005/0108999 A1 | 5/2005 | Bucher |
| 2005/0217230 A1* | 10/2005 | Bucher ..................... 56/10.2 R |
| 2006/0100820 A1* | 5/2006 | Davidson ..................... 702/151 |
| 2008/0174079 A1* | 7/2008 | Brookes et al. ............ 280/6.153 |
| 2010/0191408 A1 | 7/2010 | Boylston et al. |

OTHER PUBLICATIONS

Powers, et al., "Preventing tractor rollover fatalites: Performance of the NIOSH AutoROPS", Injury Prevention, 7 (Suppl I): I-54-58 (2001).

* cited by examiner

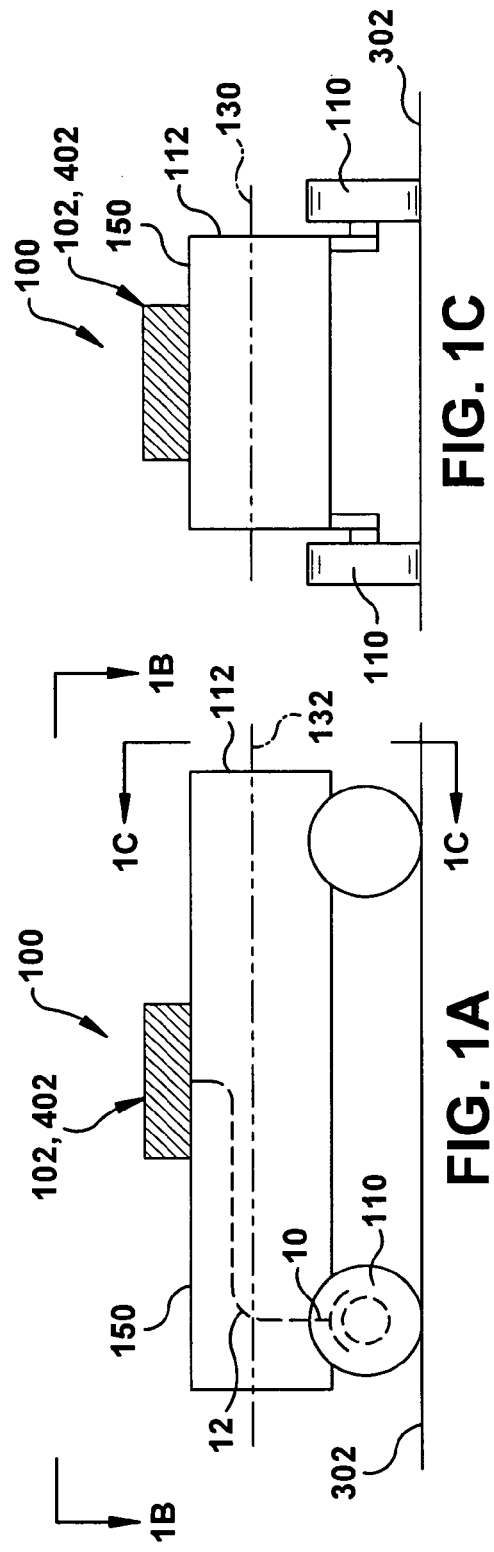
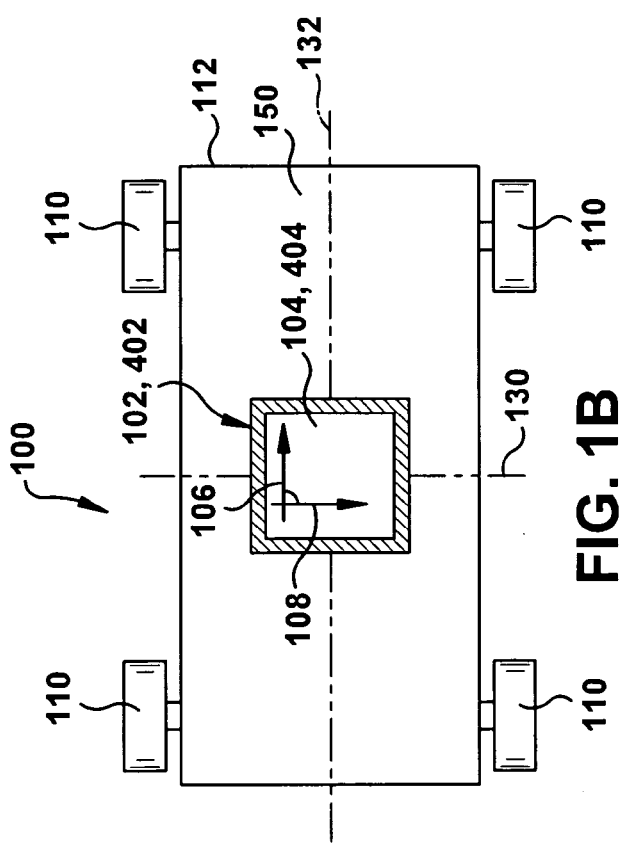

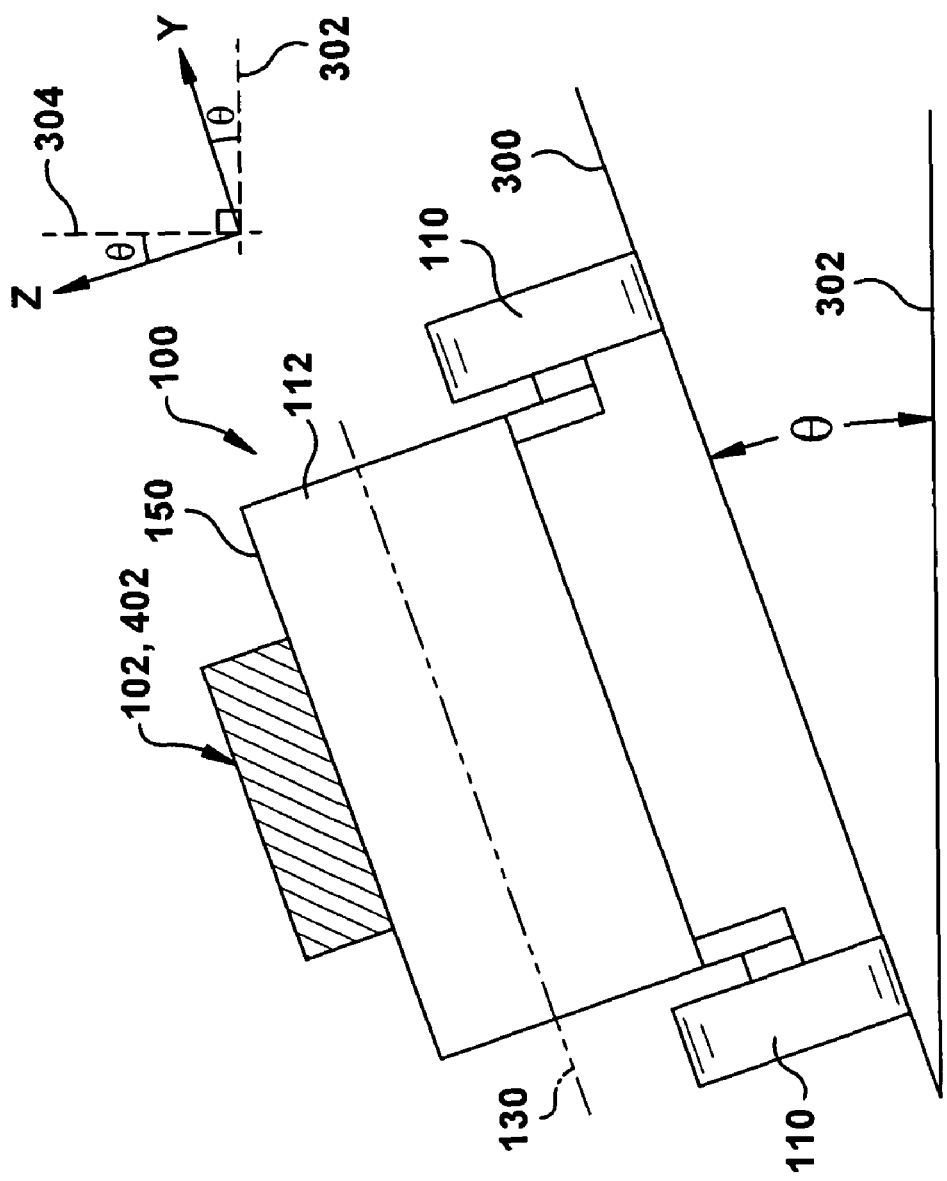

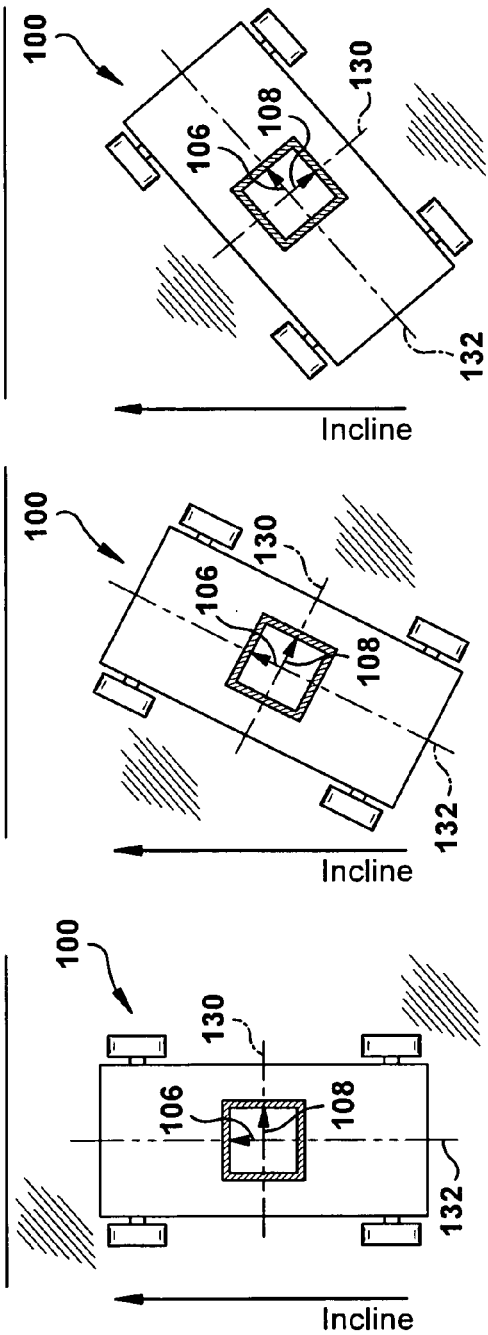

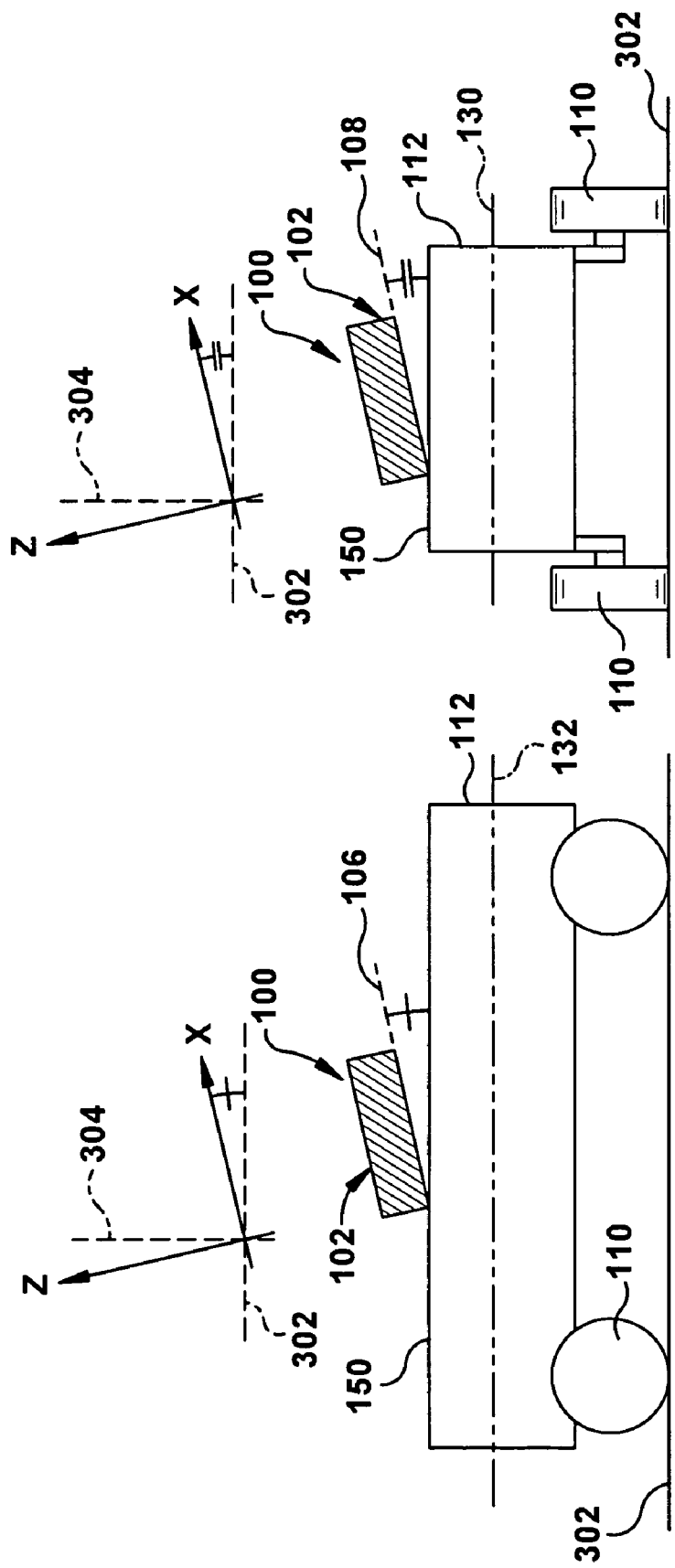

TILT AND/OR ACCELERATION SENSING APPARATUS AND METHOD

RELATED APPLICATIONS

The present application claims priority from provisional patent application Ser. No. 61/161,180, entitled "Slide Sensor," filed on Mar. 18, 2009, provisional patent application Ser. No. 61/154,615, entitled "Tilt and/or Acceleration Sensing Apparatus and Method," filed on Feb. 23, 2009, and provisional patent application Ser. No. 61/144,879, entitled "Tilt Sensing Apparatus and Method," filed on Jan. 15, 2009. Provisional application Ser. Nos. 61/161,180, 61/154,615 and 61/144,879 are incorporated herein by reference in their entirety. The present application relates to a tilt and/or acceleration sensing apparatus and method, and more particularly to a tilt and/or acceleration sensing apparatus and methods that allow a tilt and/or acceleration sensing device of a vehicle to determine a maximum fall angle of the vehicle and/or a downward slide of the vehicle.

BACKGROUND OF THE INVENTION

Many vehicles include powered implements for performing a variety of different tasks. Vehicles with powered implements include tractors, lawnmowers, trimmers, soil tillers, snow throwers, and the like. Many vehicles with powered implements are self propelled and an operator may ride on the vehicle. Vehicles with powered implements tilt as they travel over sloped surfaces, such as hills. The sloped surface that a vehicle with a powered implement travels over is often steeper than the sloped surface that automobiles travel over, since many surfaces that vehicles with powered implements are used on are not graded or paved for automobiles.

If a vehicle with a powered implement tilts too much, the vehicle could potentially tip over or slide down the incline. Vehicles with powered implements have been equipped with various tilt sensors to provide the driver with an indication that the vehicle is approaching a tilt limit and to disable the powered implement. Axial inclinometers and tip switches are examples of commonly used devices. U.S. Pat. No. 6,983,583 to Bucher discloses a lawnmower with axial and tip switch tilt sensors.

SUMMARY

The present application discloses a tilt and/or acceleration sensing apparatus and method that allows a tilt and/or acceleration sensing device of a vehicle to determine a maximum fall angle or acceleration of the vehicle down an incline. In one embodiment, a method of determining a tilt angle of the vehicle includes sensing a first tilt angle of a first sensing axis of the vehicle relative to a horizontal reference plane, sensing a second tilt angle of a second sensing axis of the vehicle relative to the horizontal reference plane, determining the maximum fall angle of the vehicle based on the first tilt angle and the second tilt angle, comparing the maximum fall angle to a first predetermined value, and generating a first output signal when the maximum fall angle exceeds the first predetermined value.

In another embodiment, a tilt sensing apparatus for a vehicle includes a tilt sensing device having a first sensing axis and a second sensing axis oriented at an angle with respect to the first sensing axis. The tilt sensing device is configured to sense a first tilt angle defined between the first sensing axis and a horizontal reference plane and generate a corresponding first tilt signal. The tilt sensing device is also configured to sense a second tilt angle defined between the second sensing axis and the horizontal reference plane and generate a corresponding second tilt signal. A processor is in operative communication with the tilt sensing device and is configured to determine a maximum fall angle of the tilt sensing device based on the first tilt signal and the second tilt signal. The maximum fall angle is a maximum angle formed between a plane of the tilt sensing device and the horizontal reference plane. The processor compares the maximum fall angle to the first predetermined value and generates a first output signal when the maximum fall angle exceeds a first predetermined value.

In another embodiment, a lawnmower includes a frame, an engine supported by the frame, a mower deck having a cutting blade that is driven by the engine, at least one drive wheel that is driven by the engine, and a tilt sensing apparatus supported by the frame for determining a maximum fall angle of the lawnmower with respect to a horizontal reference plane. The tilt sensing apparatus is configured to generate a first output signal when the maximum fall angle of the lawnmower exceeds a first predetermined value.

In one embodiment, a method of determining that a vehicle is accelerating down a slope or that the vehicle or a portion of the vehicle is falling, includes sensing an acceleration in directions of first, second, and third sensing axes of the vehicle. The second sensing axis is offset from the first sensing axis and the third sensing axis is offset from the first and second sensing axes. A magnitude of the vector sum of the accelerations sensed in the directions of the first, second, and third sensing axes is determined and compared to a first predetermined value to determine whether the vehicle is accelerating down the slope. An output signal may be generated when the vehicle is accelerating down the slope.

BRIEF DESCRIPTION OF THE DRAWINGS

These and other inventive aspects and features of the present disclosure will become apparent to one skilled in the art to which the present invention relates upon consideration of the following description of the exemplary embodiments with reference to the accompanying drawings, in which:

FIG. 1A is a schematic side elevation view of a vehicle with a tilt sensing apparatus;

FIG. 1B is a view taken along lines 1B-1B in FIG. 1A;

FIG. 1C is a view taken along lines 1C-1C in FIG. 1A;

FIG. 3A is a front view of the vehicle with the tilt sensing apparatus of FIGS. 1A-1C positioned on an inclined surface;

FIG. 5A is a top view of the vehicle with the tilt sensing apparatus of FIGS. 1A-1C positioned on an inclined surface;

FIG. 5B is another top view of the vehicle with the tilt sensing apparatus of FIGS. 1A-1C positioned on an inclined surface;

FIG. 5C is another top view of the vehicle with the tilt sensing apparatus of FIGS. 1A-1C positioned on an inclined surface;

FIG. 5D is another top view of the vehicle with the tilt sensing apparatus of FIGS. 1A-1C positioned on an inclined surface;

FIG. 5E is another top view of the vehicle with the tilt sensing apparatus of FIGS. 1A-1C positioned on an inclined surface;

FIG. 10A is a side view of the vehicle with a tilt sensing apparatus positioned in a plane not parallel with the vehicle plane;

FIG. 10B is a front view of the vehicle with a tilt sensing apparatus positioned in another plane not parallel with the vehicle plane;

DETAILED DESCRIPTION

Figure 2:
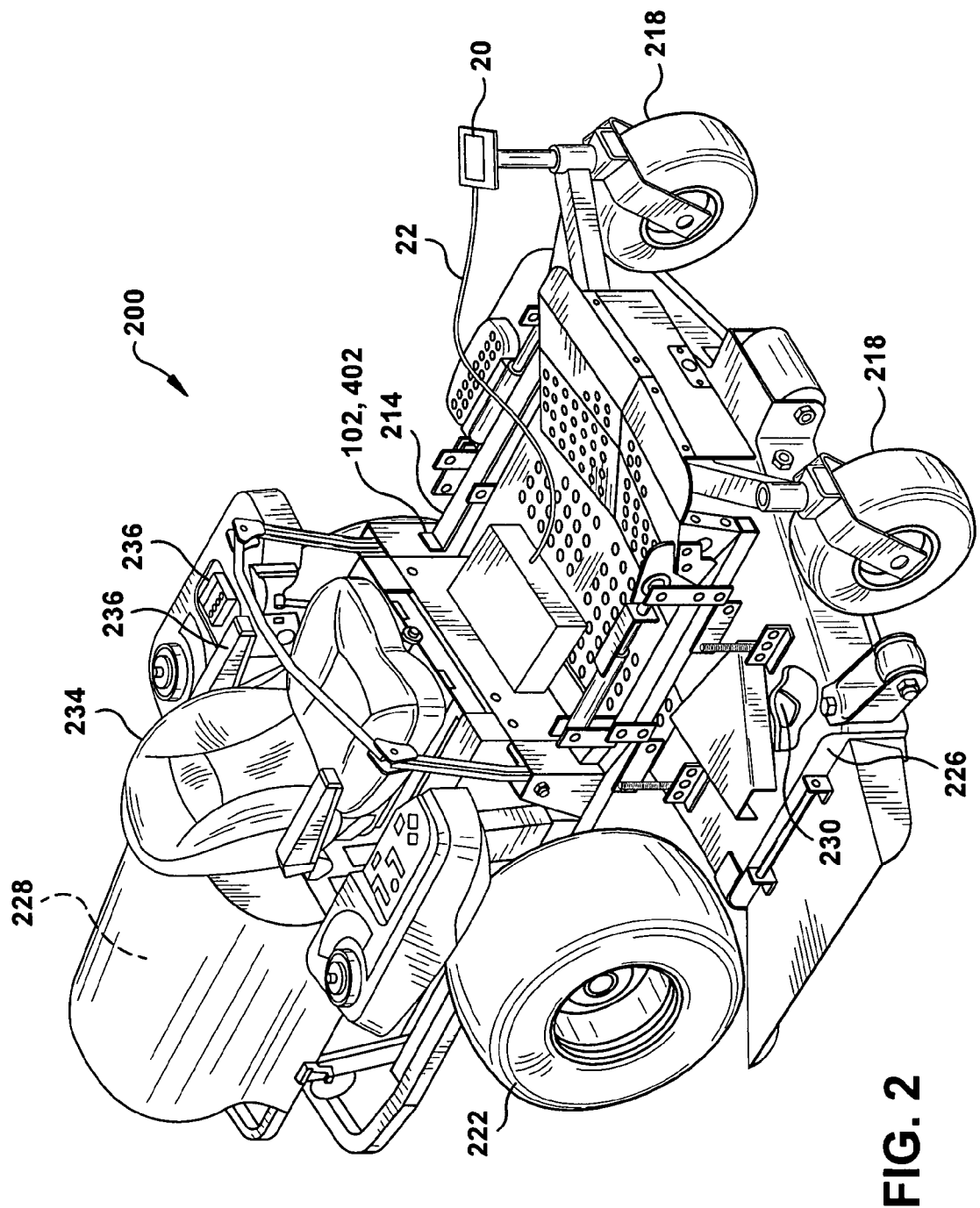
FIG. 2 is a perspective view of a lawnmower with the tilt sensing apparatus.

While the inventions are described herein with specific reference to a variety of exemplary structural and material features, such descriptions are intended to be exemplary in nature and should not be construed in a limiting sense. Further, while various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized fauns of all terms fall within each meaning.

"Circuit," as used herein, includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Operative communication," as used herein, includes, but is not limited to, a communicative relationship between devices, logic, or circuits. Direct electrical, electromagnetic, and optical connections and indirect electrical, electromagnetic, and optical connections are examples of such communications. Two devices are in operative communication if a signal from one is received by the other, regardless of whether the signal is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a CPU, are in operative communication.

"Or," as used herein, except where noted otherwise, is inclusive, rather than exclusive. In other words, "or" is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicated use of an exclusive "or" condition. Similarly, "A, B, or C, but no combinations" and "A, B, or C, but not the combination of A, B, and C" are examples where certain combination of alternatives are not included in the choices associate with the list.

"Processor," as used herein, includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as RAM, ROM, EPROM, clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein, includes, but is not limited to, one or more electrical signals, analog or digital signals, one or more computer instructions, a bit or bit stream, or the like.

"Software," as used herein, includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

FIGS. 1A-1C illustrate an embodiment of a vehicle 100 that includes a tilt sensing apparatus 102. The tilt sensing apparatus 102 includes a tilt sensing device 104. The tilt sensing device 104 is configured to sense a tilt in a first sensing axis 106 and a tilt in a second sensing axis 108. As described in more detail below, by sensing the tilt angles of the two sensing axes 106, 108, the tilt sensing device 104 can determine a maximum tilt angle of the vehicle 100.

The vehicle 100 illustrated by FIGS. 1A-1C is generic, since the tilt sensing apparatus 102 can be implemented on a wide variety of different types of vehicles. The vehicle illustrated by FIGS. 1A-1C includes wheels 110 and a frame or body 112. The vehicle 100 is also illustrated with imaginary axes of tilt or rotation: a side-to-side vehicle axis 130; and a front-to-back vehicle axis 132. A support surface 150 is shown supporting the tilt sensing apparatus 102. The tilt sensing apparatus 102 is particularly useful on vehicles 100 that include powered implements for performing a variety of different tasks, such as landscaping and construction tasks. A common arrangement used on vehicles 100 is a power take-off (PTO), which can be used to provide power to an implement or separate machine. The PTO allows implements to use power from the vehicle 100. Vehicles 100 with powered implements that may benefit from the tilt sensing apparatus 102 include, but are not limited to tractors, lawnmowers, trimmers, soil tillers, snow throwers, and the like. The tilt sensing apparatus 102 may be used on any landscaping or construction vehicle that is self propelled and that an operator rides upon and may be especially beneficial for such vehicles 100 that do not include an enclosed cabin.

FIG. 2 illustrates an example of a vehicle with a tilt sensing apparatus 102. In the example illustrated by FIG. 2, the vehicle is a lawnmower 200 with a PTO. The lawnmower 200 includes a frame 214. Front wheels 218 and rear wheels 222 support the frame 214. The rear wheels 222 are driven by an engine 228 to move the lawnmower 200 and may be independently controlled. The front wheels 218 may be caster wheels. The lawnmower shown in FIG. 2 is referred to as a zero radius turning mower. A mower deck 226 is suspended from the frame 214. A cutting blade 230 is disposed under the mower deck 226 and is driven by the engine 228. A seat 234 is supported by the frame 214. Control levers 236 are shown in front of and to the side of the seat 234. The control levers 236 control the speed and direction of the drive wheels, for example, rear wheels 222.

Figure 3B:
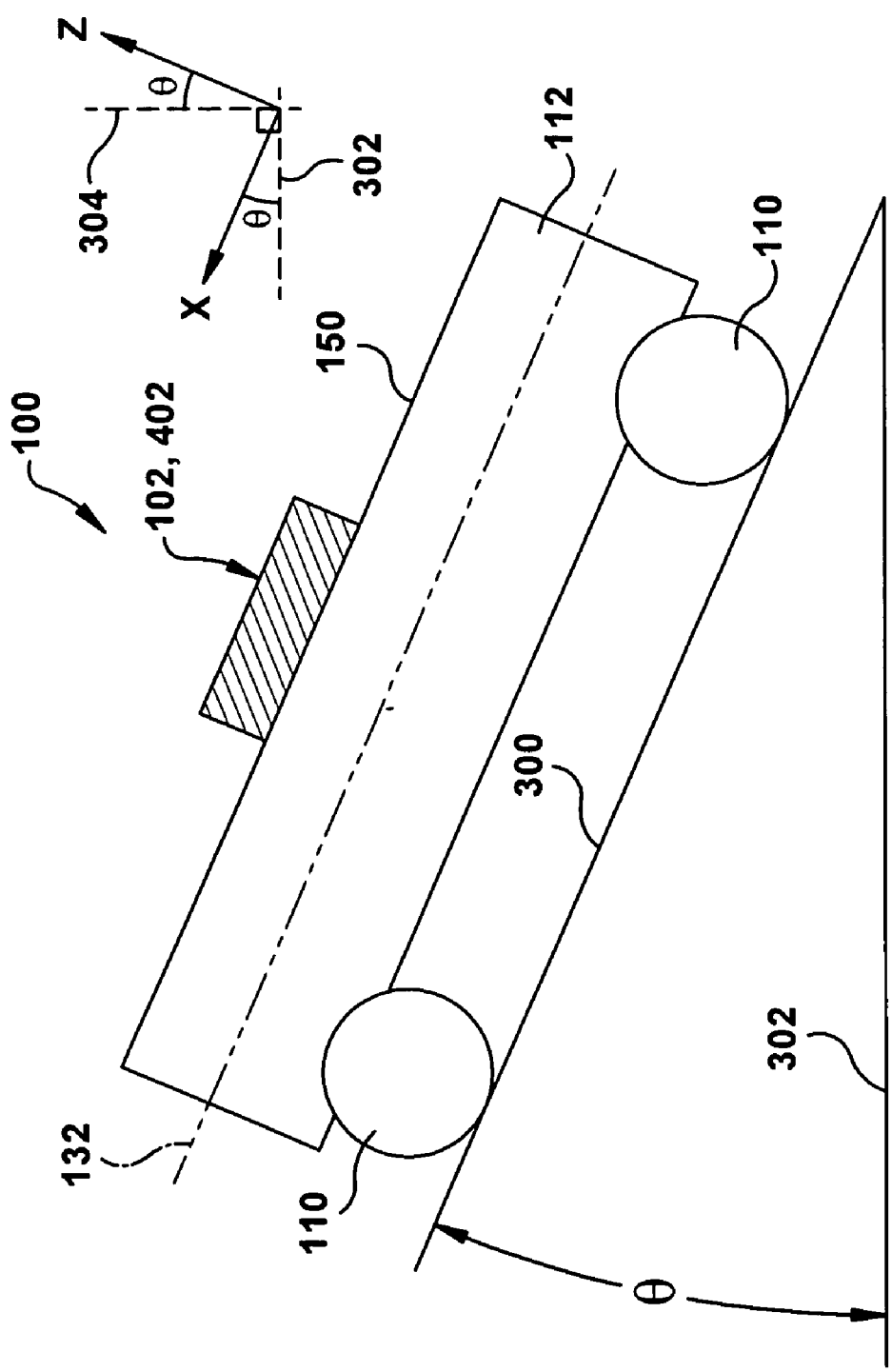
FIG. 3B is a side view of the vehicle with the tilt sensing apparatus of FIGS. 1A-1C positioned on an inclined surface.

The vehicle 100 illustrated by FIGS. 1A-1C and the lawnmower 200 illustrated by FIG. 2 may be driven on an off-road surface. The vehicle 100 and lawnmower 200 may encounter uneven terrain and may be operated on an incline, hill, or slope. FIGS. 3A and 3B illustrate the vehicle 100 positioned on a slope 300 being tilted from a horizontal reference plane 302. In FIG. 3A, the side-to-side vehicle axis 130 is positioned parallel to the steepest incline. In this manner, the side-to-side vehicle axis 130 and the vehicle 100 each experience the same angle of inclination, or a maximum fall angle $\theta$ of the vehicle 100. The maximum fall angle $\theta$ is an angle formed between a plane of the tilt sensing device 104 and the horizontal reference plane 302. In one exemplary embodiment, the plane of the tilt sensing device 104 will represent a plane of the vehicle 100.

Figure 4:
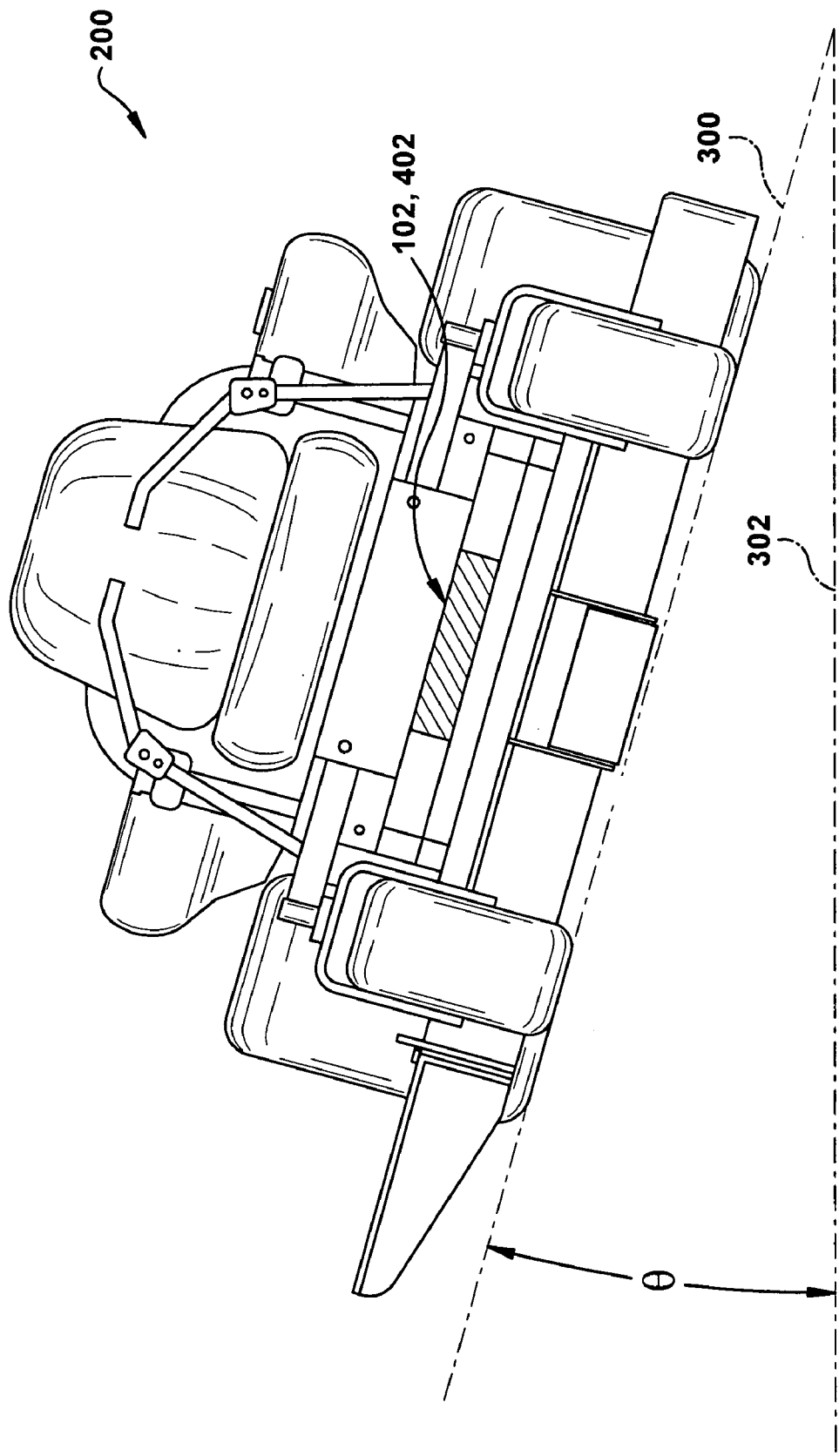
FIG. 4 is a front view of the lawnmower with the tilt sensing apparatus of FIGS. 1A-1C positioned on an inclined surface.

In FIG. 3B, the front-to-back vehicle axis 132 is positioned parallel to the steepest incline. In this manner, the front-to-back vehicle axis 132 and the vehicle 100 each experience the same maximum fall angle $\theta$. Similarly, FIG. 4 illustrates the lawnmower 200 positioned on the slope 300 being tilted from the horizontal reference plane 302.

As shown in FIGS. 3A and 3B, the tilt of the vehicle 100 will also induce the same maximum fall angle $\theta$ away from a vertical reference line 304 perpendicular to the horizontal reference plane 302. As discussed in more detail below, the maximum fall angle $\theta$ may be calculated by sensing the tilt relative to the horizontal reference plane 302 or the vertical reference line 304.

The position of the vehicle 100 or lawnmower 200 on the slope 300 defines a maximum fall angle $\theta$ of the vehicle 100 or lawnmower 200 with respect to the horizontal reference plane 302. The maximum fall angle $\theta$ is generally zero when the vehicle 100 or lawnmower 200 is on a flat, level, horizontal surface. The maximum fall angle $\theta$ increases when the vehicle 100 or lawnmower 200 is operated on an incline or traverses uneven terrain. (See FIGS. 3A, 3B, and 4).

In the embodiment shown in FIG. 1B, the tilt sensing device 104 is configured such that the first sensing axis 106 is positioned parallel to the front-to-back vehicle axis 132 and the second sensing axis 108 is positioned parallel to the side-to-side vehicle axis 130. Consequently, in this arrangement, an incline sensed on the first sensing axis 106 represents an incline experienced by the front-to-back vehicle axis 132 and a corresponding rotation experienced by the side-to-side vehicle axis 130. Similarly, an incline sensed on the second sensing axis 108 represents an incline experienced by the side-to-side vehicle axis 130 and a corresponding rotation experienced by the front-to-back vehicle axis 132.

In FIGS. 3A and 3B, either the side-to-side vehicle axis 130 or the front-to-back vehicle axis 132 is positioned parallel to the steepest incline, such that the maximum fall angle $\theta$ of the vehicle 100 is equal to the angle of inclination experienced by the axis parallel to the steepest incline. However, in many instances, neither the first sensing axis 106 nor the second sensing axis 108 is positioned parallel to the steepest incline. Referring to FIGS. 5A-5E, the vehicle 100 is shown in various positions relative to an incline.

FIG. 5A illustrates the vehicle 100 such that the front-to-back vehicle axis 132 is parallel to the steepest incline, as in FIG. 3B. In this position, the incline sensed on the first sensing axis 106 represents the maximum fall angle $\theta$ experienced by the vehicle 100, and the incline sensed on the second sensing axis 108 is zero. Similarly, FIG. 5E illustrates the vehicle 100 such that the side-to-side vehicle axis 130 is parallel to the steepest incline, as in FIG. 3A. In this position, the incline sensed on the second sensing axis 108 represents the maximum fall angle θ experienced by the vehicle 100, and the incline sensed on the first sensing axis 106 is zero. FIGS. 5B-5D illustrate vehicle 100 orientations where neither the first sensing axis 106 nor the second sensing axis 108 is positioned parallel to the steepest incline. In these positions, both the first sensing axis 106 and the second sensing axis 108 experience an incline greater than zero. However, neither of the sensing axes 106, 108 experience the maximum fall angle θ experienced by the vehicle 100, which is the angle of the steepest incline.

Figure 6A:
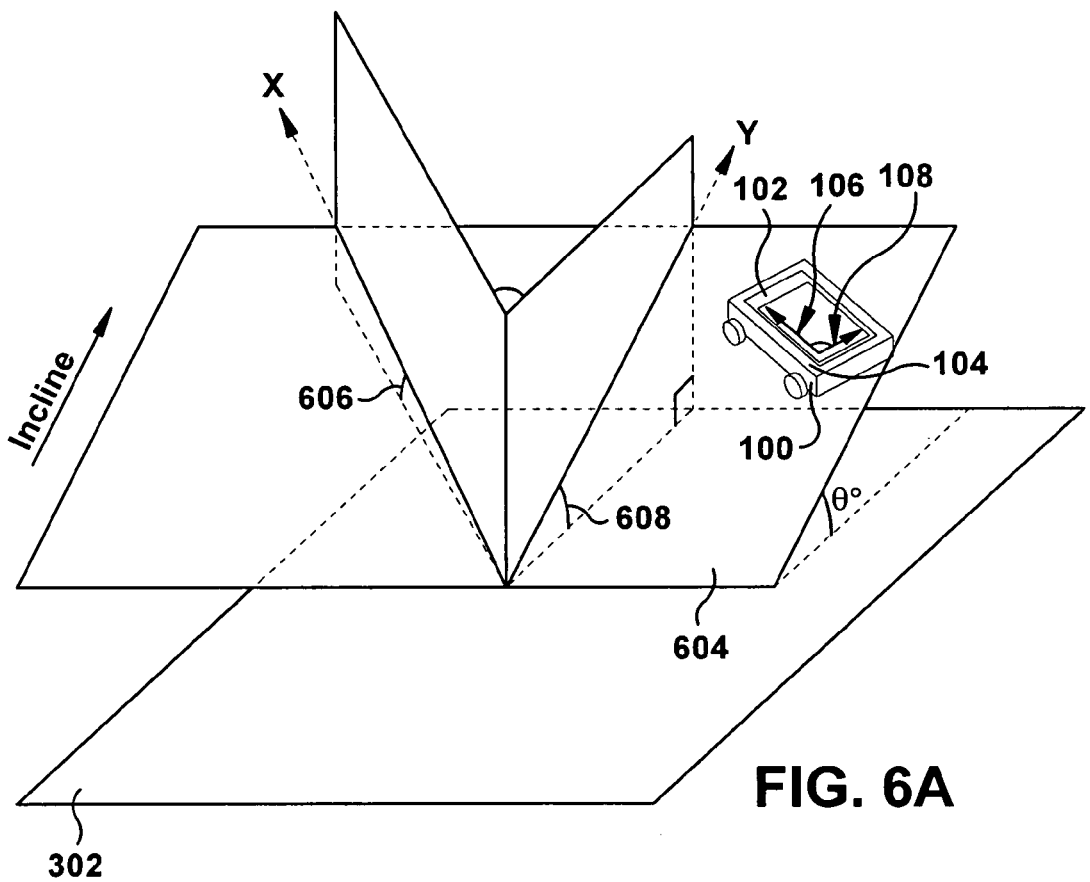
FIG. 6A is a perspective view of the vehicle with the tilt sensing apparatus of FIGS. 1A-1C positioned on an inclined surface depicting first and second tilt angles.

FIG. 6A illustrates the vehicle 100 on an incline, positioned such that neither the first sensing axis 106 nor the second sensing axis 108 is positioned parallel to the steepest incline. In this embodiment, the incline experienced by the tilt sensing device 104 and the vehicle 100 is represented by a plane 604. The maximum fall angle θ experienced by the vehicle 100 is shown as the angle between the plane 604 and the horizontal reference plane 302. In FIG. 6A, X represents the position of the first sensing axis 106 and Y represents the position of the second sensing axis 108. The X and Y axes are shown in planes perpendicular to the horizontal reference plane 302. A first tilt angle 606 is shown representing the incline sensed on the first sensing axis 106, that is, the angle formed between the first sensing axis 106 and the horizontal reference plane 302. A second tilt angle 608 is shown representing the incline sensed on the second sensing axis 108, that is, the angle formed between the second sensing axis 108 and the horizontal reference plane 302. FIG. 6A depicts the relationship between the first tilt angle 606, the second tilt angle 608, and the maximum fall angle θ.

Figure 6B:
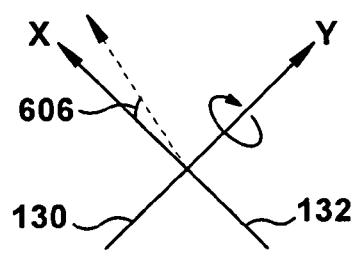
FIG. 6B is a drawing showing the relationship between the first tilt angle and axis rotation.
Figure 6C:
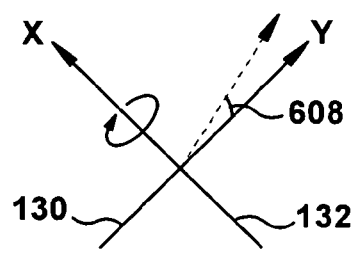
FIG. 6C is a drawing showing the relationship between the second tilt angle and axis rotation.

In one embodiment, the sensing axes 106, 108 may be positioned such that the tilt angles 606, 608 represent the roll and pitch of the vehicle 100. As illustrated in FIG. 6B, the first tilt angle 606, sensed by tilt sensing device 104, may be positioned to sense the pitch of the vehicle 100 (i.e. the rotation of the vehicle 100 about the axis 130). As illustrated in FIG. 6C, the second tilt angle 608, sensed by tilt sensing device 104, may be positioned to sense the roll of the vehicle 100 (i.e. the rotation of the vehicle 100 about the axis 132).

Figure 7A:
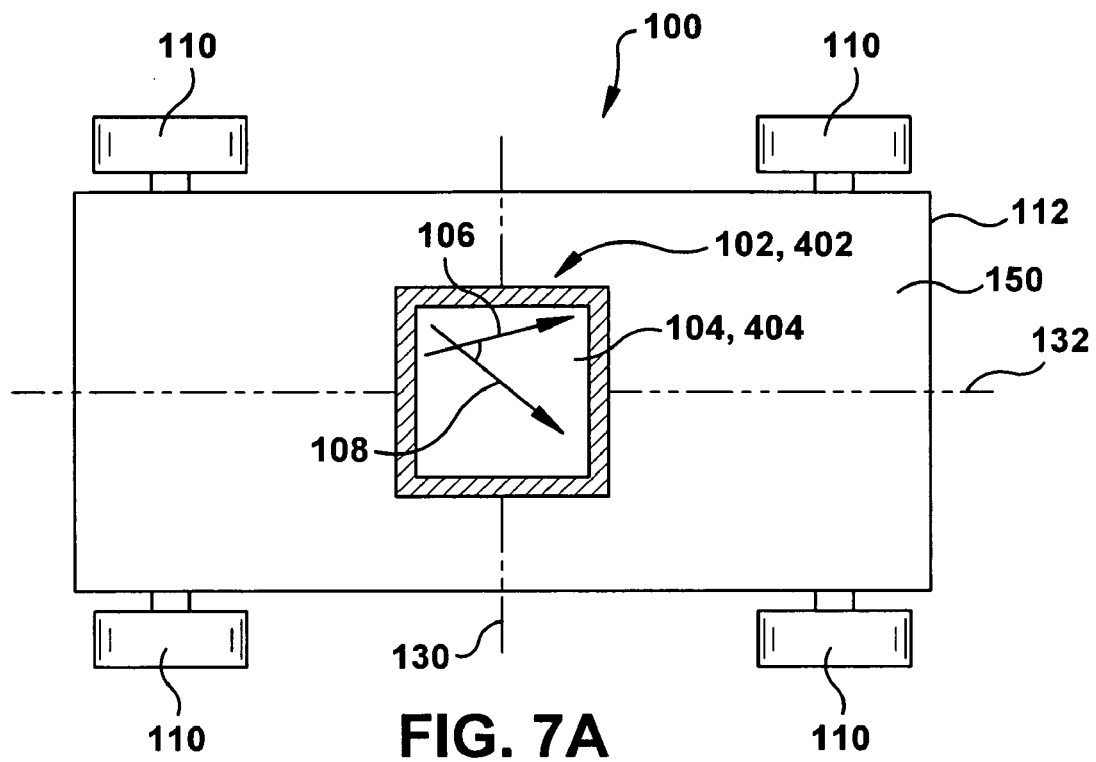
FIG. 7A is another top view of the vehicle showing a tilt sensing apparatus with non-orthogonal sensing axes.

The sensing axes 106, 108 may have any angle greater than zero between them, but do not have to be orthogonal to each other or align with the vehicle axes 130, 132. For example, as shown in the embodiment in FIG. 7A, the first sensing axis 106 is positioned at an angle greater than zero degrees to the second sensing axis 108, but the first sensing axis 106 is not orthogonal to the second sensing axis 108. For convenience, in some embodiments, the sensing axes 106, 108 may be positioned orthogonal to each other.

Figure 7B:
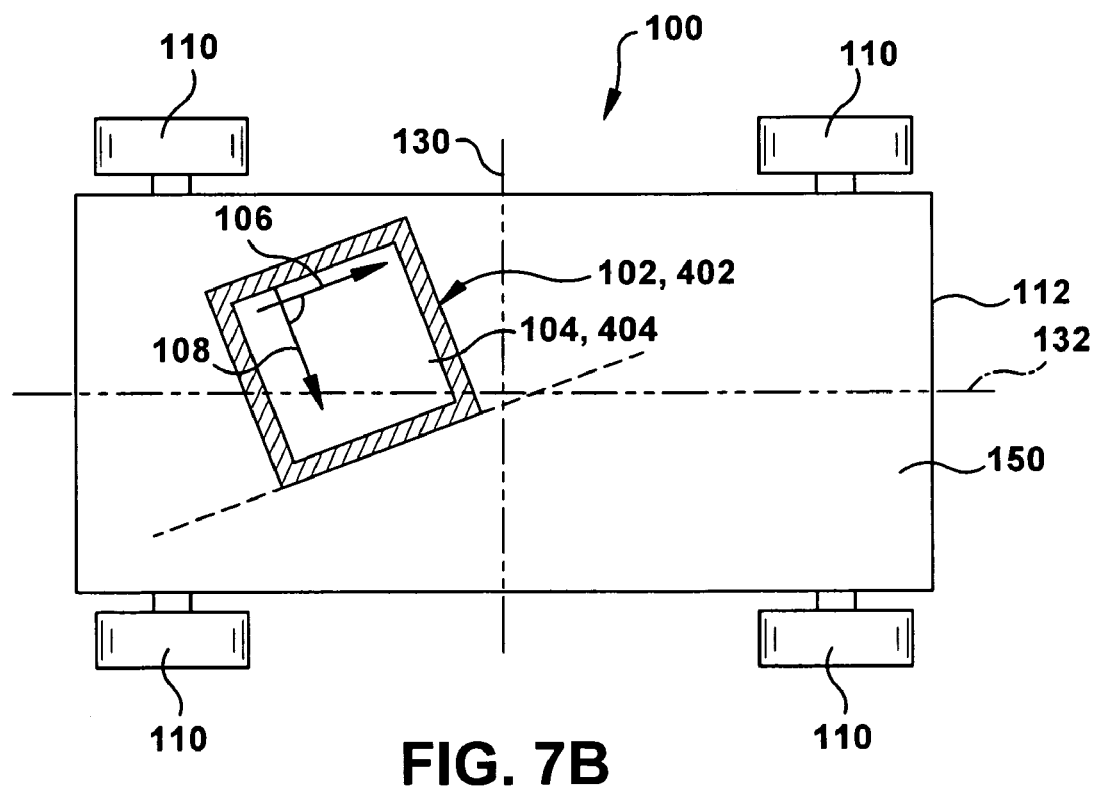
FIG. 7B is another top view of the vehicle showing a tilt sensing apparatus positioned with sensing axes not parallel to vehicle axes.

Whether the sensing axes 106, 108 are positioned orthogonal to each other or not, the sensing axes 106, 108 may also be positioned at any angle relative to the vehicle 100. For example, as shown in the embodiment in FIG. 7B, the tilt sensing device 104 may be positioned on the vehicle 100 at any angle relative to the vehicle axes 130, 132. In the orientation shown in FIG. 7B, neither of the sensing axes 106, 108 are aligned with the vehicle axes 130, 132.

When the tilt angles 606, 608 are sensed, the maximum fall angle θ of the vehicle 100 or lawnmower 200 can be calculated, which is discussed in detail below. In various embodiments, predetermined values that determine when an indication will be provided to the operator and/or when a safety measure will be taken can be set for the first tilt angle 606, the second tilt angle 608, or the maximum fall angle θ. In some embodiments, the tilt angles 606, 608 and predetermined values may correspond to the pitch and roll of the vehicle 100.

A wide variety of different tilt sensing devices 104 may be used as part of the tilt sensing apparatus 102. Any sensor or combination of sensors capable of detecting a tilt or rotation corresponding to the first tilt angle 606 and the second tilt angle 608 may be used. Examples of tilt sensors or combinations of sensors that may be used as part of the tilt sensing device 104, which can detect the tilt angles 606, 608 include, but are not limited to inclinometers (including liquid capacitive and electrolytic), accelerometers, gyroscopes, plumb bobs, bubble levels, ball bearings or other spherical objects in a bowl with position or limit sensors, a pair of two dimensional bubble levels, three dimensional bubble levels, and the like. An example of an acceptable three-axis accelerometer that may be used as the tilt sensing device 104 is a Freescale™ Semiconductor MMA7260QT.

Figure 8:
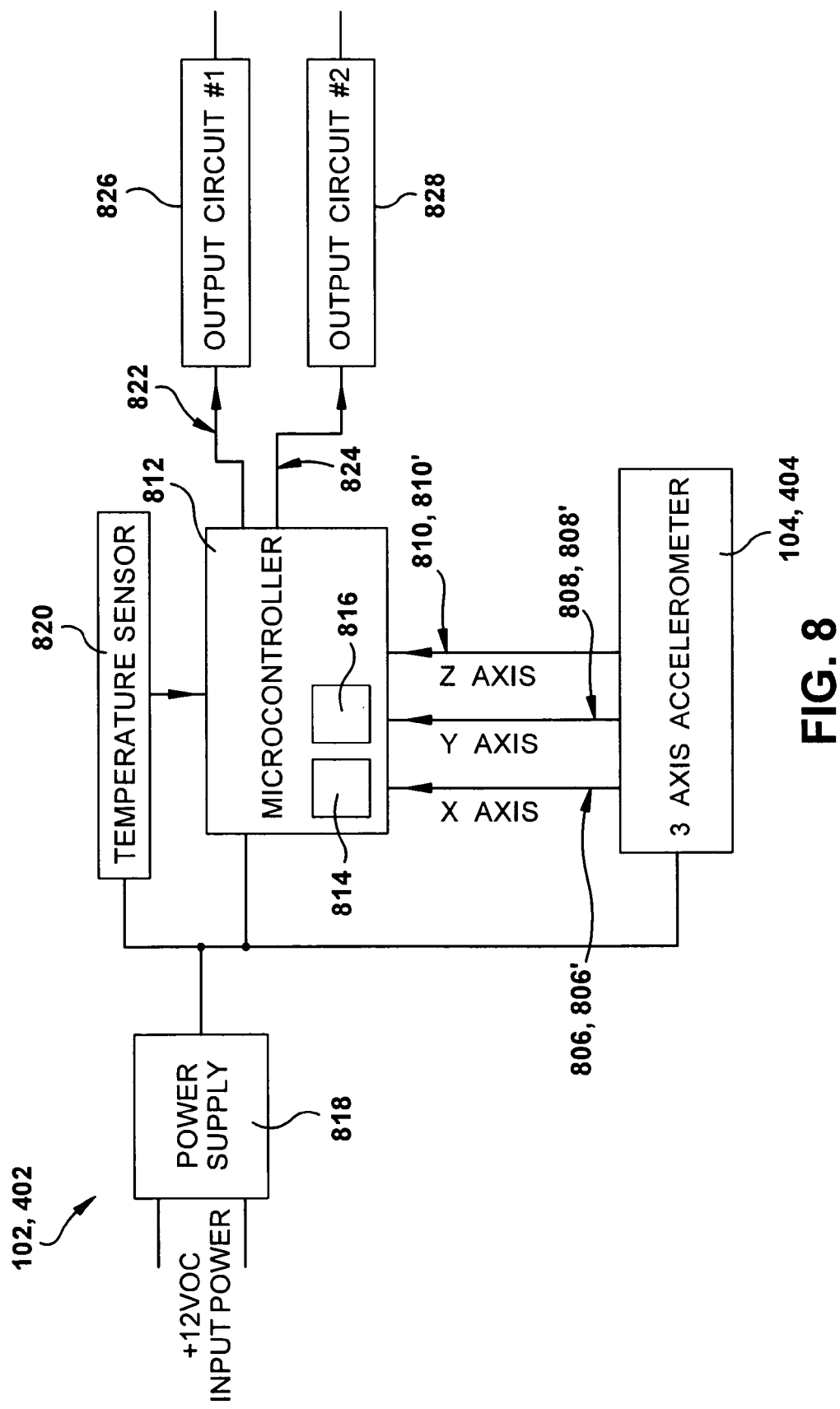
FIG. 8 is a schematic block diagram of an embodiment of the tilt sensing apparatus of FIGS. 1A-1C.

In one embodiment, as illustrated in FIG. 8, the tilt sensing apparatus 102 may be configured as a circuit. In the illustrated embodiment, the tilt sensing device 104 is a three-axis accelerometer, however, any type of sensor may be substituted for the accelerometer. The three-axis accelerometer includes three accelerometers, corresponding to orthogonal axes X, Y, and Z. These accelerometers can be utilized as tilt sensors of the tilt sensing device 104. The X-axis accelerometer may correspond to the first sensing axis 106 and sense the first tilt angle 606. Similarly, the Y-axis accelerometer may correspond to the second sensing axis 108 and sense the second tilt angle 608. The Z-axis accelerometer may correspond to a third sensing axis, positioned orthogonally to both the X-axis and Y-axis accelerometers, generally pointing up when the vehicle 100 is positioned on the horizontal reference plane 302 and sensing the tilt angle relative to the vertical reference line 304. The tilt sensing device 104 generates a first tilt signal 806 corresponding to the first tilt angle 606 (X-axis), a second tilt signal 808 corresponding to the second tilt angle 608 (Y-axis), and a third tilt signal 810 corresponding to the tilt relative to the vertical reference line 304 (Z-axis).

The embodiment in FIG. 8 also includes a controller 812. The controller 812 may be a computer, microcomputer, microcontroller, integrated circuit, or the like. The controller 812 may include one or more processors 814 used to execute instructions that carry out a specified logic routine(s). In addition, the controller 812 may have a memory 816 for storing data, logic routine instructions, programs, files, operating system instructions, and the like. As illustrated, the logic of the tilt sensing apparatus 102, discussed in detail below, may be stored by the memory 816. The memory 816 may comprise several devices, including volatile and non-volatile memory components. Accordingly, the memory 816 may include, for example, random access memory (RAM), read-only memory (ROM), hard disks, floppy disks, optical disks (e.g., CDs and DVDs), tapes, flash devices and/or other memory components, plus associated drives, players and/or readers for the memory devices. The processor 814 and the memory 816 may be coupled using a local interface (not shown). The local interface may be, for example, a data bus with accompanying control bus, a network, or other subsystem.

The controller 812 may have various input/output (I/O) interfaces as well as one or more communications interfaces. The I/O interfaces may be used to operatively couple the controller 812 to various peripherals, such as the tilt sensing device 104, a power supply 818, a temperature sensor 820, output circuits, a microphone (not shown), a camera (not shown), a printer (not shown), a speaker (not shown), and so forth. The communications interfaces may include for example, a modem (not shown) or a network interface card (not shown). The communications interfaces may enable the controller 812 to send and receive data signals, voice signals, video signals, and the like to and from other computing devices via an external network (e.g., the Internet), a wide area network (WAN), a local area network (LAN), direct data link, or similar systems. The interface between the controller 812 and any operatively interfaced device or network may be wired or wireless.

The memory 816 may store an operating system that is executed by the processor 814 to control the allocation and usage of resources in the controller 812. Specifically, the operating system may control the allocation and usage of the memory 816, the processing time of the processor 814 dedicated to various applications being executed by the processor 814, and the peripheral devices, as well as performing other functionality.

The controller 812 is operatively coupled to the tilt sensing device 104. Tilt signals 806, 808, 810 generated by the tilt sensing device 104 are communicated to the controller 812 via the I/O interface. In one embodiment, signals corresponding to the first tilt angle 606 and the second tilt angle 608 are communicated to the controller 812. Based on these tilt angles 606, 608, the controller 812 can calculate the maximum fall angle θ.

As mentioned above, predetermined values may be established that represent threshold tilt angles, which when exceeded may trigger a response by the tilt sensing apparatus 102. These predetermined values may be stored in the memory 816 of the controller 812. When a predetermined value is exceeded, the tilt sensing apparatus 102 may generate an output that may trigger an indication to the operator or a safety measure. The predetermined values may correspond to threshold tilt angles for the first tilt angle 606, the second tilt angle 608, and/or the maximum fall angle θ of the vehicle 100. As shown in FIG. 8, the controller 812 of the tilt sensing apparatus 102 may be configured to generate output signals 822, 824 when predetermined values are exceeded. For example, a first output signal 822 may be generated by the controller 812 when the maximum fall angle θ of the vehicle 100 exceeds a first predetermined value. Similarly, a second output signal 824 may be generated by the controller 812 when the maximum fall angle θ of the vehicle 100 exceeds a second predetermined value.

The embodiment of the tilt sensing apparatus 102 shown in FIG. 8 also includes output circuits 826, 828. These output circuits 826, 828 correspond to output signals 822, 824. The output circuits 826, 828 may correspond to any type of indicator, display, safety device, or the like. For example, a first output circuit 826 may correspond to a warning light circuit indicating that the maximum fall angle θ of vehicle 100 has exceeded the first predetermined value (e.g., established to equate to approaching an unsafe condition) and a second output circuit 828 may correspond to a circuit that will remove power to the implement of the vehicle 100 (i.e. the cutting blade 230 of the lawnmower 200) or activate a roll bar when the maximum fall angle θ has exceeded the second predetermined value (e.g., established to equate to an unsafe condition). The usefulness of the output circuits 826, 828 will be discussed in more detail below.

Figure 9:
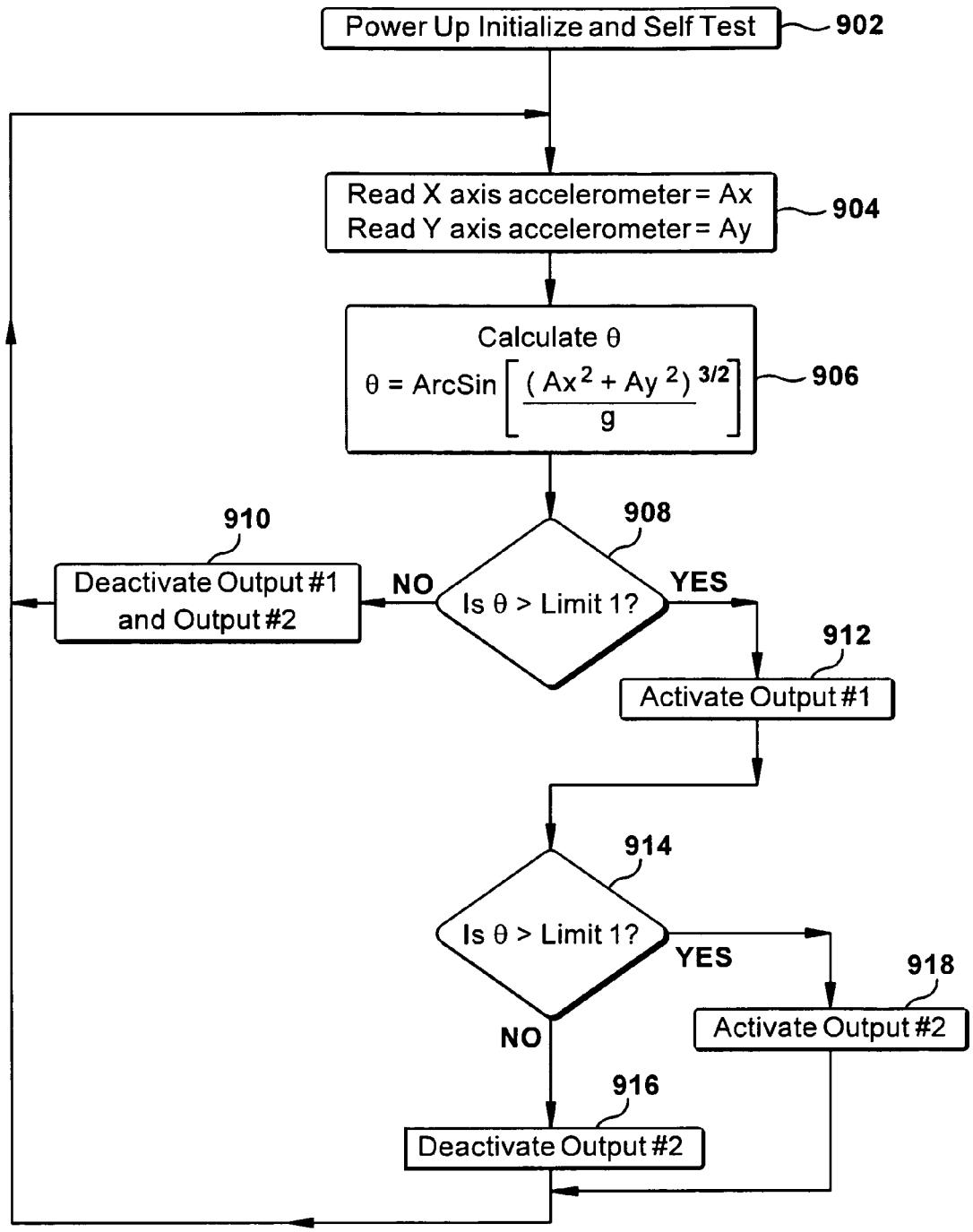
FIG. 9 is a logical flowchart of an embodiment of a method of determining a tilt angle of a vehicle and providing an indication of when the vehicle exceeds a predetermined tilt angle.

The block diagram in FIG. 9 represents one embodiment of how the maximum fall angle θ is calculated and utilized, generally relating to the tilt sensing apparatus 102 embodiment of FIG. 8. The diagram may not poi tray the organization of specific logic, programming code, or circuitry. Although FIG. 9 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, or messages may be added to the logical flow for purposes of enhanced utility, accounting, performance, measurement, troubleshooting, and the like. It is understood that all such variations are within the scope of the present invention.

In FIG. 9, the logical flow for the tilt sensing apparatus 102 may begin in block 902 where the tilt sensing apparatus 102 executes a power up, initialize, and self test routine. The power up, initialize, and self test routine may include any preparations for operation. For example, block 902 may include initializing the controller 812 or processor 814 by setting up the I/O interfaces, initializing the memory 816 variables to the proper power up values, reading calibration data and computing preliminary calibration constants, or briefly activating then deactivating the output signals 822, 824 to verify proper operation of the controller 812 and the output circuits 826, 828.

After completion of the power up, initialize, and self test routine in block 902, the logical flow may proceed to block 904, where the tilt sensing apparatus 102 may read the signal values from the X-axis and Y-axis accelerometers of the tilt sensing device 104. "Ax" denotes the value of the X-axis accelerometer, which corresponds to the first tilt angle 606, and "Ay" denotes the value of the Y-axis accelerometer, which corresponds to the second tilt angle 608. (See also FIG. 6A.) In this embodiment, the Z-axis accelerometer is not utilized by the tilt sensing apparatus 102. These values may be stored in the memory 816 of the controller 812.

Next, the logical flow may proceed to block 906, where the controller 812 of the tilt sensing apparatus 102 calculates the maximum fall angle θ of the vehicle 100. The maximum fall angle θ is calculated according to the following formula, where "g" is acceleration due to gravity (32 ft/sec/sec or 9.8 m/sec/sec):

$$\theta = \text{ArcSin}\left(\frac{\sqrt{Ax^2 + Ay^2}}{g}\right)$$

After calculation of the maximum fall angle θ, the logical flow may proceed to block 908, where a determination is made as to whether the maximum fall angle θ exceeds a limit 1, which corresponds to the first predetermined value. Upon a negative determination in block 908, the logical flow may proceed to block 910, where the output signals 822, 824 are deactivated. (See also FIG. 8.) After deactivating the output signals 822, 824, the logical flow may return to block 904, where the tilt sensing apparatus 102 again may read the X-axis and Y-axis accelerometers of the tilt sensing device 104. Upon a positive determination in block 908, the logical flow may proceed to block 912, where the first output signal 822 is activated.

Next, the logical flow may proceed to block 914, where a determination is made as to whether the maximum fall angle θ exceeds a limit 2, which corresponds to the second predetermined value. Upon a negative determination in block 914, the logical flow may proceed to block 916, where the second output signal 824 is deactivated. (See also FIG. 8.) After deactivating output signal 824, the logical flow may return to block 904, where the tilt sensing apparatus 102 again may read the X-axis and Y-axis accelerometers of the tilt sensing device 104. Upon a positive determination in block 914, the logical flow may proceed to block 918, where the second output signal 824 is activated.

Next, the logical flow may proceed to block 904, where the tilt sensing apparatus 102 again may read the X-axis and Y-axis accelerometers of the tilt sensing device 104.

In another embodiment, the tilt sensing apparatus may determine the maximum fall angle θ of the vehicle 100 by sensing the tilt of the Z-axis. In this embodiment, in block 904 of FIG. 9, the tilt sensing apparatus 102 may read the signal value from the Z-axis accelerometer of the tilt sensing device 104 instead of or in addition to reading the signal values from the X-axis and Y-axis accelerometers, Ax and Ay. "Az" denotes the value of the Z-axis accelerometer, which corresponds to a tilt angle in any direction relative to the vertical reference line 304. This value may be stored in the memory 816 of the controller 812.

In this embodiment, in block 906, where the controller 812 of the tilt sensing apparatus 102 calculates the maximum fall angle θ of the vehicle 100, the maximum fall angle θ may be calculated using Az instead of Ax and Ay according to the following formula, where "g" is acceleration due to gravity (32 ft/sec/sec or 9.8 m/sec/sec):

$$\theta = \text{ArcCos}\left(\frac{Az}{g}\right)$$

In one embodiment, by continuously calculating the maximum fall angle θ of the vehicle 100, the tilt sensing apparatus 102 can provide output signals 822, 824 that can continuously indicate the tilt of the vehicle 100, regardless of the orientation of the vehicle 100 on the incline. Referring again to FIGS. 5A-5E and 6A, the tilt sensing apparatus 102 indicates the maximum fall angle θ of the vehicle 100 while on the incline, regardless of the orientation of the vehicle 100 on the incline, as represented in FIGS. 5A-5E. In this example, where the incline is the same in FIGS. 5A-5E, the maximum fall angle θ stays the same even though the tilt angles 606, 608 vary depending on the orientation of the vehicle 100 on the incline.

For example, in FIG. 5A and with reference to FIG. 6A, if the first sensing axis 106 is aligned parallel to the front-to-back vehicle axis 132 and the front-to-back vehicle axis 132 is parallel to the steepest incline, then the maximum fall angle θ will be equal to the first tilt angle 606 and the second tilt angle 608 will be zero. Similarly, in FIG. 5E and with reference to FIG. 6A, if the second sensing axis 108 is aligned parallel to the side-to-side vehicle axis 130 and the side-to-side vehicle axis 130 is parallel to the steepest incline, then the maximum fall angle θ will be equal to the second tilt angle 608 and the first tilt angle 606 will be zero.

However, in FIGS. 5B-5D and with reference to FIG. 6A, neither of the vehicle axes 130, 132 is parallel to the incline, neither of the tilt angles 606, 608 is equal to zero, and the maximum fall angle θ is not equal to either of the tilt angle 606, 608. In any of these orientations, the maximum fall angle θ is still parallel to the steepest incline and is greater than either of the tilt angles 606, 608. By calculating the maximum fall angle θ based on the tilt angles 606, 608, the tilt sensing apparatus 102 maintains a measure of the tilt of the vehicle 100, regardless of the orientation of the vehicle 100 on the incline.

In this embodiment, the maximum fall angle θ calculated by the tilt sensing apparatus 102 and the output signals 822, 824 are the same for any vehicle 100 orientation on the incline, as represented in part by the orientations in FIGS. 5A-5E.

In contrast, if the output signals 822, 824 of tilt sensing apparatus 102 were configured to indicate exceeding predetermined values of the tilt angles 606, 608, such as roll and pitch, instead of the maximum fall angle θ, the output signals 822, 824 may change as the vehicle 100 was positioned in various orientations on the incline, such as those represented in FIGS. 5A-5E. In some cases, both tilt angles 606, 608 may be below individual predetermined values, whereas the maximum fall angle θ may simultaneously exceed a preferred incline threshold. Therefore, in many applications it is advantageous to continuously calculate and provide outputs based on the maximum fall angle θ.

In one embodiment, the tilt sensing apparatus 102 determines the maximum fall angle θ and provides the output signals 822, 824 that help to reduce the likelihood that an operator of the vehicle 100 or lawnmower 200 will unknowingly encounter an unsafe incline condition. The output signals 822, 824 of the tilt sensing apparatus 102 can be used in a wide variety of different ways. For example, the output signals 822, 824 of the tilt sensing apparatus 102 can be used to provide an indication to the operator that the maximum fall angle θ has exceeded one of the predetermined values. For example, one of the predetermined values may correspond to a maximum slope recommended by the manufacturer of the vehicle 100 or lawnmower 200 or the maximum recommended slope reduced by a factor of safety. For example, the predetermined value may be ten degrees, fifteen degrees, twenty degrees, twenty-five degrees, thirty degrees, or between ten degrees and thirty degrees. However, the predetermined value may be any tilt angle that is suitable for the particular vehicle 100 that the tilt sensing apparatus 102 is used on.

The output signals 822, 824 of the tilt sensing apparatus 102 may be used to provide more than one indication of the maximum fall angle θ to the operator. For example, a first indication or check indicator may be provided to the operator when the value of the maximum fall angle θ reaches the first predetermined value and a second indication or limit indicator may be provided to the operator when the value of the maximum fall angle θ reaches the second predetermined value. The first predetermined value may be an arbitrary angle that is selected by the manufacturer to provide the operator with an indication that the vehicle 100 has encountered a significant slope. The second predetermined value may be an angle selected by the manufacturer to provide the operator with an indication that if the maximum fall angle θ continues to increase, an unsafe condition will result. For example, the first predetermined value may be ten degrees, fifteen degrees, or between ten degrees and fifteen degrees and the second predetermined value may be twenty degrees, twenty-five degrees, or between twenty and twenty-five degrees.

In another embodiment, the output signals 822, 824 of the tilt sensing apparatus 102 may be used to drive a display or gauge that provides a reading of the maximum fall angle θ to the operator. A secondary indicator may also be included that provides an indication to the operator that an unsafe condition is being approached in addition to the display or gauge. The output signals 822, 824 may drive any number of indicators, displays, and gauges and any number of sensors may be included. The indicators, displays, and gauges may be visual, audible, and/or tactile.

The output signals 822, 824 of the tilt sensing apparatus 102 can also be used to make the vehicle 100 safer when the maximum fall angle θ has reached the predetermined value.

Any safety precaution may be taken when the maximum fall angle θ reaches or exceeds the predetermined value. A safety precaution may include actuating a safety device, such as an interrupt circuit, roll bar, restraint system, brake, warning message, warning light, communication device, or the like. An interrupt circuit may disable or remove power to the engine, mower deck, drive wheel, or any other PTO device. For example, a powered implement of the vehicle 100 or the cutting blade 230 of the lawnmower 200 may be disabled and/or braked when the tilt sensing apparatus 102 indicates that the maximum fall angle θ has exceeded the predetermined value. Similarly, an operator restraint system, such as a seat belt slack adjuster, may be activated, a roll bar may move to or lock in a protective position, such as movement of a roll bar from a lowered position to an upright, protective position, and/or an anti-roll system that reduces the likelihood that the vehicle 100 or lawnmower 200 will tip over may be activated when the maximum fall angle θ exceeds the predetermined value. One or more of these safety precautions may be taken in addition to providing the operator with an indicator, one or more of these safety precautions may be taken without providing the operator with an indicator, or the operator may be provided with an indicator without taking further safety precautions.

In another embodiment, the tilt sensing apparatus 102 may utilize the temperature sensor 820 during any calculations, including but not limited to the determination of the maximum fall angle θ. For example, the tilt sensing device 104 may operate differently depending on the temperature. In particular, the tilt signals 806, 808, 810 of the tilt sensing device 104 may vary with temperature. For instance, when the tilt sensing device 104 is tilted to a position with an exemplary angle, a tilt signal (such as 806, 808, or 810) may read ¼ g at 30 degrees F. and 3/16 g at 100 degrees F., even though the position of the tilt sensing device 104 is at the same angle during each reading. In this situation, the tilt sensing apparatus 102 may compensate the calculation of the maximum fall angle θ based on the current temperature. To do this, a temperature compensation curve may be developed based on tilt sensing device 104 testing. The temperature compensation curve may be used to compensate tilt signal 806, 808, 810 readings based on the temperature sensed by the temperature sensor 820. Information related to temperature compensation, such as the temperature compensation curve, may be stored in the memory 816 of the controller 812.

In an exemplary embodiment, before a vehicle 100 or lawnmower 200 is sold to a customer or returned to a customer after servicing a system of the vehicle 100 or lawnmower 200, the tilt sensing apparatus 102 installed on the vehicle 100 or lawnmower 200 may be calibrated. In this application, calibration refers to any adjustment for the difference between a plane of the tilt sensing device 104 and a concurrent plane of the vehicle 100. The adjustment may be mechanical, electronic, logic based, or by any other means. The objective of calibrating is to ensure that the tilt sensing device 104 accurately senses the position of the vehicle 100 relative to the horizontal reference plane 302. If the sensing axes 106, 108 are not aligned in a plane parallel with the vehicle axes 130, 132, then, without calibration, the tilt sensing apparatus 102 may not accurately sense the position of the vehicle 100. By calibrating the sensing axes 106, 108, a known relationship is established between the sensing axes 106, 108 and the vehicle axes 130, 132, such that the tilt sensing apparatus 102 may accurately sense the position of the vehicle 100.

In an embodiment using calibration, the tilt sensing apparatus 102 may also sense and account for the tilt of the Z-axis. Since the Z-axis may not be orthogonal to the plane of the vehicle 100 when the tilt sensing device 104 is not positioned in a plane parallel to the plane of the vehicle 100, the tilt sensing device 104 may not accurately sense the position of the vehicle 100 without accounting for the tilt of the Z-axis.

For example, in the embodiment shown in FIG. 10A, the tilt sensing apparatus 102 is positioned at an angle relative to the support surface 150 of vehicle 100. In this position, the first sensing axis 106 of the tilt sensing device 104 (represented by X) is not parallel to the front-to-back vehicle axis 132. Similarly, in the embodiment shown in FIG. 10B, the tilt sensing apparatus 102 is positioned at another angle relative to the support surface 150 of vehicle 100. In this position, the second sensing axis 108 of the tilt sensing device 104 (represented by Y) is not parallel to the side-to-side vehicle axis 130. In both of these embodiments, the tilt sensing apparatus 102 may be calibrated to adjust for the difference between the plane of the sensing axes 106, 108 and the concurrent plane of the vehicle axes 130, 132. In any embodiment where the plane of the tilt sensing apparatus 102 (and the corresponding sensing axes 106, 108) is not parallel to the plane of the vehicle 100 (and the corresponding vehicle axes 130, 132), calibration may be utilized and the tilt sensing apparatus 102 may sense and account for the tilt of the Z-axis.

For example, to calibrate the tilt sensing apparatus 102, the vehicle 100 may be positioned on a level surface representing the horizontal reference plane 302. While in this position, a calibration routine may be initiated establishing that the current tilt signals 806, 808, 810 generated by the tilt sensing device 104 correspond to zero degree tilt angles of the vehicle 100. In subsequent calculations by the tilt sensing apparatus 102, an adjustment may be made for any difference between the sensing axes 106, 108 and the vehicle axes 130, 132. In addition, the tilt of the Z-axis may be sensed and included in the calculations. Information related to calibration adjustments may be stored in the memory 816 of the controller 812.

In one embodiment, the tilt sensing apparatus 102 may be calibrated by utilizing any known coordinate transformation. Coordinate transformation systems are well known in mathematics and any suitable system may be used. In this manner, the tilt angles measured while the vehicle 100 is positioned on a level surface define a level coordinate set, even if the tilt angles are not equal to zero. Once the level coordinate set is defined, subsequent measurements may be transformed to represent a coordinate set that does have level values equal to zero. This may be accomplished by measuring the tilt signals 806, 808, 810 generated by the tilt sensing device 104 while the vehicle 100 is positioned on a level surface representing the horizontal reference plane 302, storing the measurements in the memory 816, and transforming subsequent measurements of the tilt signals 806, 808, 810 such that they represent accurate tilt angles of the vehicle 100, which excludes any tilt angle of the tilt sensing apparatus 102.

In another embodiment, when the angle between the tilt sensing apparatus 102 and the plane of the vehicle 100 is relatively small, for example, five degrees or less, the tilt sensing apparatus 102 may be calibrated by offsetting any difference between the sensing axes 106, 108 and the vehicle axes 130, 132. This may be accomplished by measuring the tilt signals 806, 808 generated by the tilt sensing device 104 while the vehicle 100 is positioned on a level surface representing the horizontal reference plane 302, storing the measurements as X and Y offsets in the memory 816, and subtracting the X and Y offsets from any subsequent measurement of the tilt signals 806, 808 during calculations of the maximum fall angle θ.

However, unlike a coordinate transformation, offsetting may induce some level of error or reduced sensitivity into the calculation of the maximum fall angle θ. Compounding errors may occur when both tilt angles 606, 608 include an offset, creating a compound offset, such that offsetting one tilt angle induces a small error into the other tilt angle since the offset axes or vectors are no longer related by the original angle between them. For example, axes that were originally perpendicular to each other may be more or less than 90 degrees to each other after they are offset. The formula used to calculate the maximum fall angle θ may assume the original angle still relates the two axes. In addition, excluding the tilt of the Z-axis from the calculations ignores some measure of X-axis or Y-axis tilt when offsetting, although it may be minimal at relatively small calibration angles.

Figure 11C:
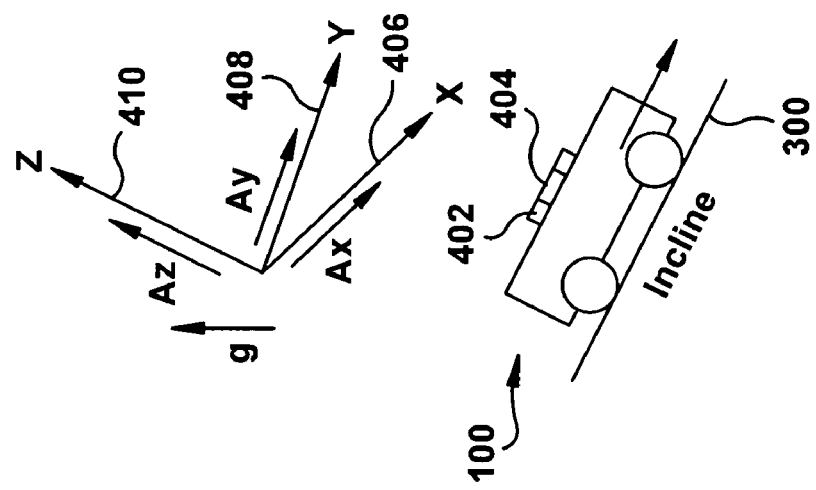
FIG. 11C is a schematic side elevation view of a vehicle with an acceleration sensing apparatus accelerating down an incline, showing the orientation of three sensing axes and acceleration vectors.
Figure 11B:
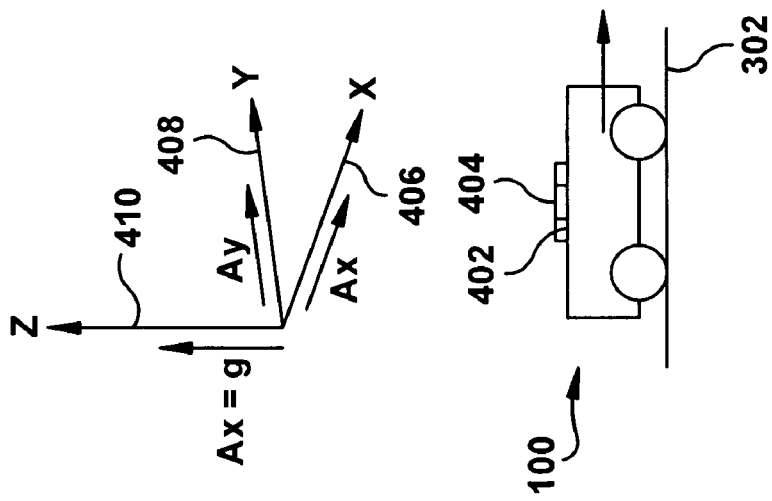
FIG. 11B is a schematic side elevation view of a vehicle with an acceleration sensing apparatus accelerating horizontally, showing the orientation of three sensing axes and acceleration vectors.
Figure 11A:
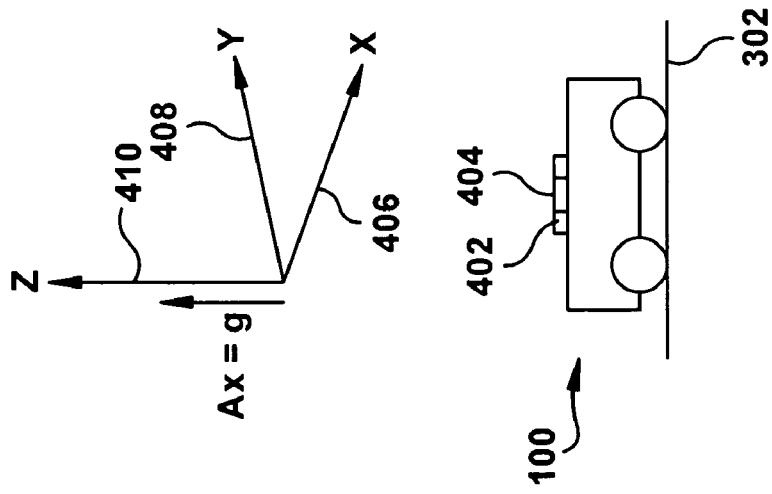
FIG. 11A is a schematic side elevation view of a stationary vehicle with an acceleration sensing apparatus, showing the orientation of three sensing axes.

In another embodiment, a downward slide or a downward drop of all or a portion of the vehicle 100 may be sensed, in addition to or instead of sensing the tilt of the vehicle 100. In this embodiment, an acceleration sensing apparatus may be configured to sense when the vehicle 100 is in a downward slide. FIGS. 11A-11C illustrate an embodiment including the vehicle 100 that includes an acceleration sensing apparatus 402. The acceleration sensing apparatus 402 includes a acceleration sensing device 404. The acceleration sensing device 404 is configured to sense an acceleration in a direction of first sensing axis 406, an acceleration in a direction of second sensing axis 408, and an acceleration in a direction of third sensing axis 410. As described in more detail below, by sensing the accelerations of the three sensing axes 406, 408, 410, the acceleration sensing device 404 can determine a magnitude of a vector sum of the accelerations of the three sensing axes 406, 408, 410 of the vehicle 100. This vector sum may be used to indicate when the vehicle may be sliding down an incline.

A force or acceleration due to gravity "g" acts on the acceleration sensing apparatus 402. In the exemplary embodiment, the accelerations sensed by the acceleration sensing apparatus 402 are the actual acceleration of the vehicle 100 (i.e., the speeding up and slowing down of the vehicle) and the acceleration due to gravity g. In one exemplary embodiment, the magnitude of the vector sum of the accelerations of the three sensing axes 406, 408, 410 of the vehicle 100 is the sum of measured accelerations due to both actual acceleration of the vehicle 100 and acceleration due to gravity.

In one embodiment, the sensing axes 406, 408, 410 may be positioned such that they are orthogonal to each other. For example, the first sensing axis 406 may be represented by X and positioned parallel to the front-to-back vehicle axis 132; the second sensing axis 408 may be represented by Y and positioned parallel to the side-to-side vehicle axis 130; and the third sensing axis 410 may be represented by Z and positioned parallel to the vertical reference line 304 (see also FIGS. 3A-3B). As discussed above, Ax may represent the acceleration sensed by the first sensing axis 406; Ay may represent the acceleration sensed by the second sensing axis 408; and Az may represent the acceleration sensed by the third sensing axis 410.

FIG. 11A illustrates the vehicle 100 stationary on the horizontal reference plane 302. In this position, only "g," the acceleration due to gravity, acts on the vehicle 100, such that Az=g. FIG. 11B illustrates the vehicle 100 accelerating on the horizontal reference plane 302. In this position, accelerations Ax and Ay may act on the vehicle 100, but Az remains the same as in FIG. 11A, where Az=g. FIG. 11C illustrates the vehicle 100 accelerating down an incline or slope 300. In this situation, accelerations Ax, Ay, and Az may indicate that the vehicle is experiencing less than one g. As discussed in detail below, a downward slide may be detected when a downward acceleration results in an acceleration of less than one g acting on the vehicle 100.

The sensing axes 406, 408, 410 may have any angle greater than zero between them, but do not have to be orthogonal to each other or align with the vehicle axes 130, 132 or the vertical reference line 304. As shown in the exemplary embodiment of the acceleration sensing apparatus 402 in FIG. 7A, the first sensing axis 406 may be positioned at any angle greater than zero degrees to the second sensing axis 408, but the first sensing axis 406 does not have to be orthogonal to the second sensing axis 408. For convenience, in some embodiments, the sensing axes 406, 408, 410 may be positioned orthogonal to each other.

Whether the sensing axes 406, 408, 410 are positioned orthogonal to each other or not, the sensing axes 406, 408, 410 may also be positioned at any angle relative to the vehicle 100. As shown in the exemplary embodiment of the acceleration sensing apparatus 402 in FIG. 7B, the acceleration sensing device 404 may be positioned on the vehicle 100 at any angle relative to the vehicle axes 130, 132.

When the accelerations of the three sensing axes 406, 408, 410 of the vehicle 100 or lawnmower 200 are sensed, the magnitude of the vector sum of the accelerations Ax, Ay, and Az, denoted as |A|, can be calculated, which is discussed in detail below. In various embodiments, predetermined values of |A| that determine when an indication will be provided to the operator and/or when a safety measure will be taken can be set.

A wide variety of different acceleration sensing devices 404 may be used as part of the acceleration sensing apparatus 402. Any sensor or combination of sensors capable of detecting or determining an acceleration corresponding to the three sensing axes 406, 408, 410 may be used. Examples of acceleration sensors or combinations of sensors that may be used as part of the acceleration sensing device 404, which can detect the accelerations Ax, Ay, and Az include, but are not limited to accelerometers, global positioning systems, wheel speed and direction sensors, combinations thereof, and the like. An example of an acceptable three-axis accelerometer that may be used as the acceleration sensing device 404 is an Analog Devices ADXL345.

In other exemplary embodiments, the same accelerometer may be used for the tilt sensing device 104 and the acceleration sensing device 404. The same type of accelerometer may be used in more than one device of the vehicle 100 and/or one accelerometer may be used as both the tilt sensing device 104 and the acceleration sensing device 404 of the vehicle 100.

In one embodiment, the acceleration sensing apparatus 402 may be configured as a circuit illustrated in FIG. 8. In this embodiment, the acceleration sensing device 404 is a three-axis accelerometer, however, any type of suitable sensor may be substituted for the accelerometer. The three-axis accelerometer includes three accelerometers, corresponding to orthogonal axes X, Y, and Z. These accelerometers can be utilized to detect the accelerations Ax, Ay, and Az. The X-axis accelerometer may correspond to the first sensing axis 406; the Y-axis accelerometer may correspond to the second sensing axis 408; and the Z-axis accelerometer may correspond to the third sensing axis 410. The acceleration sensing device 404 generates acceleration signals 806', 808', 810' corresponding to the accelerations Ax, Ay, and Az of sensing axes 406, 408, 410 respectively.

As illustrated and discussed above, the circuit of FIG. 8 may be configured in the same manner whether operating as the tilt sensing apparatus 102 or the acceleration sensing apparatus 402. The logic of the acceleration sensing apparatus 402, discussed in detail below, may be stored by the memory 816. The controller 812 is operatively coupled to the acceleration sensing device 404. Acceleration signals 806', 808', 810' generated by the acceleration sensing device 404 are communicated to the controller 812 via the I/O interface. Based on these acceleration signals 806', 808', 810', the controller 812 can calculate the magnitude of the vector sum of the accelerations Ax, Ay, and Az, denoted as |A|.

As mentioned above, predetermined values may be established that represent threshold downward acceleration rates, which when exceeded may trigger a response by the acceleration sensing apparatus 402. These predetermined values may be stored in the memory 816 of the controller 812. When a predetermined value is met, the acceleration sensing apparatus 402 may generate an output that may trigger an indication to the operator and/or a safety measure. The predetermined values may correspond to threshold downward acceleration rates for the vehicle 100. As shown in FIG. 8, the controller 812 of the acceleration sensing apparatus 402 may be configured to generate output signals 822, 824 when predetermined values are met. For example, a first output signal 822 may be generated by the controller 812 when the vector sum |A| drops below a first predetermined value. Similarly, a second output signal 824 may be generated by the controller 812 when the vector sum |A| drops below a second predetermined value. The lower vector sum |A| is below g, the higher the downward acceleration rate will be.

The embodiment of the acceleration sensing apparatus 402 shown in FIG. 8 also includes output circuit 826 and optional output circuit 828. These output circuits 826, 828 correspond to output signals 822, 824. The output circuits 826, 828 may correspond to any type of indicator, display, safety device, or the like. For example, a first output circuit 826 may correspond to a warning light circuit indicating that the vector sum |A| of vehicle 100 has dropped below the first predetermined value (e.g., established to equate to approaching an unsafe condition) and a second output circuit 828 may correspond to a circuit that will actuate a brake of the vehicle 100 (i.e. braking the front caster wheels 218 of the lawnmower 200) when the vector sum |A| has dropped below the second predetermined value (e.g., established to equate to an unsafe condition). The usefulness of the output circuits 826, 828 will be discussed in more detail below. In another embodiment, only one output circuit 826 is included that may provide an indicator and/or take a precautionary measure. Any number of output circuits and any number of indicators and/or precautionary measures may be taken based on the accelerations sensed by the apparatus 402.

Figure 12:
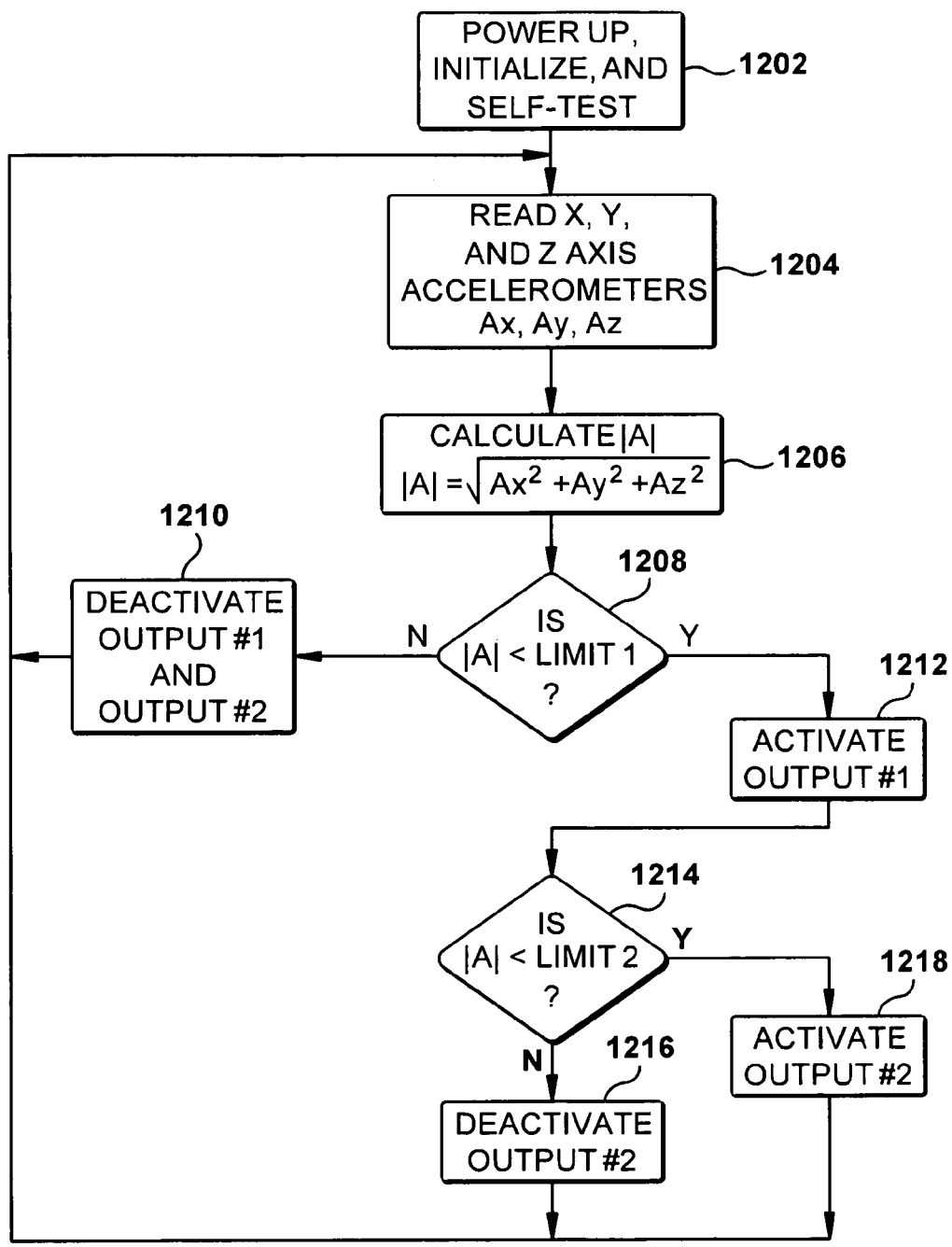
FIG. 12 is a logical flowchart of an embodiment of a method of determining an acceleration of a vehicle and providing an indication of when the vehicle may be sliding or dropping downward.

The block diagram in FIG. 12 represents one embodiment of how the magnitude of the vector sum of the accelerations Ax, Ay, and Az, denoted as |A|, is calculated and utilized, generally relating to the acceleration sensing apparatus 402 embodiment of FIG. 8. The diagram may or may not portray the organization of specific logic, programming code, or circuitry. Although FIG. 12 shows a specific order of executing functional logic blocks, the order of executing the blocks may be changed relative to the order shown. Also, two or more blocks shown in succession may be executed concurrently or with partial concurrence. Certain blocks also may be omitted. For example, a comparison with a second limit may not be required. In addition, any number of functions, logical operations, commands, state variables, or messages may be added to the logical flow for purposes of enhanced utility, accounting, performance, measurement, troubleshooting, and the like. It is understood that all such variations are within the scope of the present invention.

In FIG. 12, the logical flow for the acceleration sensing apparatus 402 may begin in block 1202 where the acceleration sensing apparatus 402 executes an optional power up, initialize, and self test routine. The power up, initialize, and self test routine may include any preparations for operation. For example, block 1202 may include initializing the controller 812 or processor 814 by setting up the I/O interfaces, initializing the memory 816 variables to the proper power up values, reading calibration data and computing preliminary calibration constants, or briefly activating then deactivating the output signals 822, 824 to verify proper operation of the controller 812 and the output circuits 826, 828.

After completion of the power up, initialize, and self test routine in block 1202, the logical flow may proceed to block 1204, where the acceleration sensing apparatus 402 may read the signal values from the X-axis, Y-axis, and Z-axis accelerometers of the acceleration sensing device 404. In the embodiment of FIG. 8, the acceleration sensing device 404 generates acceleration signals 806', 808', 810' corresponding to the accelerations Ax, Ay, and Az of sensing axes 406, 408, 410 respectively.

Next, the logical flow may proceed to block 1206, where the controller 812 of the tilt acceleration sensing apparatus 402 calculates the magnitude of the vector sum of the accelerations Ax, Ay, and Az of the vehicle 100, denoted as |A|. The vector sum |A| is calculated according to the following formula:

$$|A| = \sqrt{Ax^2 + Ay^2 + Az^2}$$

After calculation of the vector sum |A|, the logical flow may proceed to block 1208, where a determination is made as to whether the vector sum |A| is less than a limit 1, which corresponds to the first predetermined value. In an exemplary embodiment, limit 1 may be any value that is equal to or less than acceleration due to gravity g. Upon a negative determination in block 1208, the logical flow may proceed to block 1210, where the output signals 822, 824 are deactivated. (See also FIG. 8.) After deactivating the output signals 822, 824, the logical flow may return to block 1204, where the acceleration sensing apparatus 402 again may read the signal values from the X-axis, Y-axis, and Z-axis accelerometers of the acceleration sensing device 404. Upon a positive determination in block 1208, the logical flow may proceed to block 1212, where the first output signal 822 is activated.

Next, the logical flow may proceed to an optional routine that begins at block 1214, where a determination is made as to whether the vector sum |A| is less than a limit 2, which corresponds to the second predetermined value. For example, limit 2 may correspond to a value that is less than limit 1. Upon a negative determination in block 1214, the logical flow may proceed to block 1216, where the second output signal 824 is deactivated. (See also FIG. 8.) After deactivating output signal 824, the logical flow may return to block 1204, where the acceleration sensing apparatus 402 again may read the signal values from the X-axis, Y-axis, and Z-axis accelerometers of the acceleration sensing device 404. Upon a positive determination in block 1214, the logical flow may proceed to block 1218, where the second output signal 824 is activated.

Next, the logical flow may proceed to block 1204, where the acceleration sensing apparatus 402 again may read the signal values from the X-axis, Y-axis, and Z-axis accelerometers of the acceleration sensing device 404.

In one embodiment, by continuously calculating the vector sum |A| of the vehicle 100, the acceleration sensing apparatus 402 can provide output signals 822, 824 that can continuously indicate the magnitude of the acceleration of the vehicle 100.

During normal operation of the vehicle 100 when the vehicle is not accelerating downward, the magnitude of the vector sum of the accelerations of the three sensing axes 406, 408, 410 (Ax, Ay, and Az respectively), denoted as |A|, is equal to or greater than one g, where "g" is the acceleration due to gravity. Usually, the only time the vector sum |A| is less than one g is when the acceleration sensing device 404 is freefalling, sliding or accelerating downwards towards earth, for example, when the vehicle 100 slides down an incline or accelerates down an incline. During a vehicle 100 freefall, the vector sum |A| will equal zero. When the vehicle 100 is sliding downhill, the vector sum |A| may be between zero and g, depending on the steepness of the slope and the rate of downward acceleration. Conditions other than downward accelerations that may result in a vector sum |A| between zero and g may be distinguished from a downward acceleration and appropriately filtered or masked. For example, upward decelerations may cause a reading of |A| that is less than g. This upward deceleration may be detected and filtered or masked, such that an indication of downward acceleration is not incorrectly provided.

For example, referring again to FIG. 11A, the vehicle 100 is stationary with only the acceleration of gravity acting on the acceleration sensing apparatus 402 (Az=g), such that the vector sum |A| will be equal to one g, where Ax and Ay are equal to zero. In FIG. 11B, the vehicle 100 is accelerating along the horizontal reference plane 302, such that Ax and Ay are not equal to zero and Az=g. In this scenario, the vector sum |A| will be equal to at least one g. That is, in the scenario illustrated by FIG. 11B, the vector sum |A| will be:

$$|A| = \sqrt{g^2 + Ax^2 + Ay^2}$$

FIG. 11C illustrates the vehicle 100 accelerating down an incline or slope 300. In this situation, the vector sum |A| may be less than one g, since the vehicle 100 may be accelerating towards earth. This downward acceleration will subtract from the acceleration due to gravity. This condition may indicate that the vehicle 100 is sliding down an incline, since under most normal operating conditions, the vehicle 100 is not accelerating down an incline. Usually, an operator is maintaining or slowing the speed of the vehicle 100 when moving downhill. Therefore, a downhill acceleration may be an indication of a downhill slide or other potentially unsafe condition.

The output signals 822, 824 of the acceleration sensing apparatus 402 can be used in a wide variety of different ways. In one embodiment, the acceleration sensing apparatus 402 determines the vector sum |A| and provides the output signals 822, 824 that help to reduce the likelihood that an operator of the vehicle 100 or lawnmower 200 will encounter a downward slide condition. For example, the output signals 822, 824 of the acceleration sensing apparatus 402 can be used to provide an indication to the operator or actuate a safety device when the vector sum |A| has dropped below one of the predetermined values. For example, one of the predetermined values may correspond to one g. In this example, if the vector sum |A| is less than one g, the output signal 822 may activate output signal 826, which may actuate a brake on the wheel 110 of the vehicle 100 or one or more of the wheels 218, 222 of the lawnmower 200. However, the predetermined value may be any value that is suitable for the particular vehicle 100 that the acceleration sensing apparatus 402 is used on. In FIG. 1A, a brake 10 is schematically illustrated. The brake 10 may be provided on any number of the wheels 110. In FIG. 2, a brake 20 is schematically illustrated. The brake 20 may be provided on any number of the wheels 218 and/or 222. The lines 12 and 22 illustrate that the brakes 10, 20 may be automatically controlled by the sensing apparatus 402 when downward acceleration is sensed.

The output signals 822, 824 of the acceleration sensing apparatus 402 may be used to provide more than one indication or action based on the vector sum |A|. For example, a first action may be taken when the value of the vector sum |A| reaches the first predetermined value and a second action may be taken when the value of the vector sum |A| reaches the second predetermined value. The first predetermined value may be a value that is selected by the manufacturer to provide an action when the vehicle 100 just begins to slide downwards. The second predetermined value may be a value selected by the manufacturer to provide more drastic action if the slide worsens. For example, the first predetermined value may be one g or 0.9 g and the second predetermined value may be slightly less than the first predetermined value, for example, 0.9 g or 0.8 g respectively.

In another embodiment, the output signals 822, 824 of the acceleration sensing apparatus 402 may be used to drive a display or gauge that provides a reading of the vector sum |A| to the operator. A secondary indicator may also be included that provides an indication to the operator that an unsafe condition is being approached in addition to the display or gauge. The output signals 822, 824 may drive any number of indicators, displays, and gauges and any number of sensors may be included. The indicators, displays, and gauges may be visual, audible, and/or tactile. Any number of indicators and actions driven by the output signals 822, 824 may be used alone or in combination.

In an exemplary embodiment, the output signals 822, 824 of the acceleration sensing apparatus 402 may be used to make the vehicle 100 safer when the vector sum |A| has reached the predetermined value. Any safety precaution may be taken when the vector sum |A| drops below the predetermined value. A safety precaution may include actuating a safety device, such as an interrupt circuit, roll bar, restraint system, brake, warning message, warning light, communication device, or the like. An interrupt circuit may disable or remove power to the engine, mower deck, drive wheel, or any other PTO device. For example, a brake of the vehicle 100 or the lawnmower 200 may be actuated when the acceleration sensing apparatus 402 indicates that the vector sum |A| has dropped below the predetermined value. Similarly, an operator restraint system, such as a seat belt slack adjuster, may be activated, a roll bar may move to or lock in a protective position, such as movement of a roll bar from a lowered position to an upright, protective position, and/or an anti-roll system that reduces the likelihood that the vehicle 100 or lawnmower 200 will tip over may be activated when the vector sum |A| drops below the predetermined value. One or more of these safety precautions may be taken in addition to providing the operator with an indicator, one or more of these safety precautions may be taken without providing the operator with an indicator, or the operator may be provided with an indicator without taking further safety precautions.

In a particular lawnmower 200 embodiment, the output circuits 826, 828 of the acceleration sensing apparatus 402 may be used to actuate brakes 20 on the front caster wheels 218 of the lawnmower 200. The brake actuation output circuits 826, 828 may include a solenoid, electric motor, or linear actuator to pull a cable to apply drum, disc, or band brakes. Any brake configuration that may be suitable for a particular lawnmower 200 application may be used. For example, a solenoid valve may route pressurized hydraulic fluid to disc or drum brakes. A solenoid or linear actuator may pressurize hydraulic fluid, actuating disc or drum brakes. Electromagnetic brakes may be energized or released directly using a high current from output circuits 826, 828. The brakes may apply constant pressure or pulsed pressure to the wheels 218.

In another embodiment, the output circuits 826, 828 of the acceleration sensing apparatus 402 may be used to position the control levers 236 of the lawnmower 200 to a neutral position. The control levers 236 control the speed and direction, forward or reverse, of the drive wheels, shown in FIG. 2 as rear wheels 222. Although an operator may be attempting to reverse direction during a downhill slide by reversing the drive wheels, rotation of the wheels opposite the direction of the lawnmower 200 direction may make regaining traction less likely. Putting the drive wheels in neutral, by positioning the control levers 236 to the neutral position, may assist regaining traction. When the control levers 236 are in the neutral position, the drive wheels may also be braked. For example, the output circuits 826, 828 may be used to pressurize a hydraulic cylinder to force the control levers 236 into the neutral position and hold them there until the lawnmower 200 stops. The same solenoid valve that may be used to actuate the brakes may be used to position the control levers 236.

In one embodiment, the vehicle 100 or lawnmower 200 may have a switch or other device to enable/disable one or more safety devices driven by the output circuits 826, 828. In other embodiments, the switch or other device may enable/disable the acceleration sensing apparatus 402 or the output circuits 826, 828 instead of a specific indicator or safety device. In some situations, it may be preferred by the operator to disable a particular safety device to prevent unwanted actuation of the safety device. For example, during an up/down mowing pattern on a slope, the operator of a lawnmower 200 may use a switch to disable the actuation of the brakes by the acceleration sensing apparatus 402 to avoid repeated automatic actuation of the brakes, which may occur every time the lawnmower 200 accelerates while traveling downhill.

In an embodiment where the output circuits 826, 828 or a specific indicator or safety device may be disabled while the acceleration sensing apparatus 402 remains enabled, the vehicle 100 or lawnmower 200 may include logic or other means to automatically enable a disabled output circuit 826, 828 or device when the slope exceeds a predetermined angle. For example, the controller 812 may monitor the X-axis acceleration signal 806', which may be used to sense a slope greater than a predetermined angle, such as 15 degrees, and enable a disabled output circuit 826, 828 accordingly. Similarly, in an embodiment where the acceleration sensing apparatus 402 may be disabled, the vehicle 100 or lawnmower 200 may include sensors or other means to automatically enable the acceleration sensing apparatus 402 when the slope exceeds a predetermined angle. These automatic enabling feature would ensure that the acceleration sensing apparatus 402, associated output circuits 826, 828, and safety devices are enabled under conditions when a downhill slide is more likely to occur.

In one embodiment, the vehicle 100 or lawnmower 200 may include a switch, logic, or other manner of resetting a safety device after the safety device is actuated by the acceleration sensing apparatus 402. The reset may include only the actuated device or other machine controls. For example, after the acceleration sensing apparatus 402 actuates the brakes and the vehicle 100 or lawnmower 200 has safely stopped, a reset switch may be used to de-energize a solenoid valve and bleed down the pressure in the hydraulic cylinders before resuming normal operation.

In another embodiment, the acceleration sensing apparatus 402 may utilize the temperature sensor 820 during any calculations, including but not limited to the determination of the vector sum |A|. For example, the acceleration sensing device 404 may operate differently depending on the temperature. In particular, the acceleration signals 806', 808', 810' of the acceleration sensing device 404 may vary with temperature. For instance, when the acceleration sensing device 404 experiences a particular acceleration, an acceleration signal (such as 806', 808', or 810') may read ¼ g at 30 degrees F. and ³⁄₁₆ g at 100 degrees F., even though the acceleration of the acceleration sensing device 404 is the same during each reading. In this situation, the acceleration sensing apparatus 402 may compensate the calculation of the vector sum |A| based on the current temperature. To do this, a temperature compensation curve may be developed based on acceleration sensing device 404 testing. The temperature compensation curve may be used to compensate acceleration signal 806', 808', 810' readings based on the temperature sensed by the temperature sensor 820. Information related to temperature compensation, such as the temperature compensation curve, may be stored in the memory 816 of the controller 812.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

The invention claimed is:

1. A tilt sensing apparatus for a lawnmower, comprising:
   an accelerometer mounted to the lawnmower having a first sensing axis and a second sensing axis oriented at an angle with respect to the first sensing axis, wherein the accelerometer is configured to:
   sense a first tilt angle defined between the first sensing axis and a horizontal reference plane and generate a corresponding first tilt signal;
   sense a second tilt angle defined between the second sensing axis and the horizontal reference plane and generate a corresponding second tilt signal; and
   a processor in operative communication with the accelerometer, configured to:
   determine a maximum fall angle of the lawnmower based on the first tilt signal and the second tilt signal, wherein the maximum fall angle is an angle formed between a plane of the accelerometer and the horizontal reference plane;
   compare the maximum fall angle to a first predetermined value; and
   generate a first output signal when the maximum fall angle exceeds the first predetermined value.

2. The apparatus of claim 1, wherein the processor is further configured to: compare the maximum fall angle to a second predetermined value; and
   generate a second output signal when the maximum fall angle exceeds the second predetermined value.

3. The apparatus of claim 1, wherein the first sensing axis and the second sensing axis are positioned perpendicular to each other.

4. The apparatus of claim 1, wherein the accelerometer includes the first sensing axis, the second sensing axis, and a third sensing axis, and wherein the accelerometer is configured to generate a third tilt signal that corresponds to an angle defined between the third sensing axis and the horizontal reference plane and the processor determines the maximum fall angle based only on the first and second tilt signals.

5. The apparatus of claim 1, further including a temperature sensor, wherein the temperature sensor generates a corresponding temperature signal, the processor is in operative communication with the temperature sensor, and the processor is configured to determine the maximum fall angle based on the temperature signal.

6. The apparatus of claim 1, wherein the plane of the tilt sensing device corresponds to a plane defined by the first sensing axis and the second sensing axis.

7. A tilt sensing apparatus for a vehicle, comprising:
an accelerometer for sensing at least first and second tilt angles relative to a horizontal reference plane and generating corresponding first and second tilt signals;
a processor in operative communication with the accelerometer,
a temperature sensor that generates a corresponding temperature signal in operative communication with the processor, said processor configured to:
determine a maximum fall angle of the accelerometer based on the first tilt signal, the second tilt signal, and the temperature signal from the temperature sensor wherein the maximum fall angle is an angle formed between a plane of the accelerometer and the horizontal reference plane;
compare the maximum fall angle to a first predetermined value; and
generate a first output signal when the maximum fall angle exceeds the first predetermined value.

8. The apparatus of claim 7, wherein the processor is further configured to: compare the maximum fall angle to a second predetermined value; and
generate a second output signal when the maximum fall angle exceeds the second predetermined value.

9. A method of determining that a vehicle is accelerating down a slope, comprising: sensing an acceleration in a direction of a first sensing axis of the vehicle;
sensing an acceleration in a direction of a second sensing axis of the vehicle, wherein the second sensing axis is offset from the first sensing axis;
sensing an acceleration in a direction of a third sensing axis of the vehicle, wherein the third sensing axis is offset from the first and second sensing axes;
determining a magnitude of the vector sum of the accelerations sensed in the directions of the first, second, and third sensing axes;
comparing the magnitude to a first predetermined value to determine whether the vehicle is accelerating down the slope; and
generating a first output signal when the vehicle is accelerating down the slope.

10. The method of claim 9, wherein the first, second, and third sensing axes are orthogonal to each other.

11. The method of claim 9, wherein the first predetermined value is equal to the acceleration due to gravity.

12. The method of claim 9, further including: comparing the magnitude to a second predetermined value; and generating a second output signal when the vehicle is accelerating down the slope at a rate corresponding to the second predetermined value.

13. An apparatus for determining that a vehicle is accelerating down a slope, comprising: a acceleration sensing device including:
a first sensing axis;
a second sensing axis, wherein the second sensing axis is offset from the first sensing axis; and
a third sensing axis, wherein the third sensing axis is offset from the first and second sensing axes;
wherein the acceleration sensing device is configured to:
sense an acceleration in a direction of the first sensing axis and generate a corresponding first acceleration signal;
sense an acceleration in a direction of the second sensing axis and generate a corresponding second acceleration signal; and
sense an acceleration in a direction of the third sensing axis and generate a corresponding third acceleration signal; and
a processor in operative communication with the acceleration sensing device, configured to:
determine a magnitude of the vector sum of the accelerations sensed in the directions of the first, second, and third sensing axes;
compare the magnitude to a first predetermined value to determine whether the vehicle is accelerating down the slope; and
generate a first output signal when the vehicle is accelerating down the slope.

14. The apparatus of claim 13, wherein the first, second, and third sensing axes are orthogonal to each other.

15. The apparatus of claim 13, wherein the first predetermined value is equal to the acceleration due to gravity.

16. The apparatus of claim 13, wherein the processor is further configured to: compare the magnitude to a second predetermined value; and
generate a second output signal when the vehicle is accelerating down the slope at a rate corresponding to the second predetermined value.

17. The apparatus of claim 13, wherein the acceleration sensing device includes at least one accelerometer.

18. The apparatus of claim 17, wherein the acceleration sensing device includes a three-axis accelerometer.

19. An apparatus for determining that a vehicle is accelerating down a slope, comprising:
means for sensing an acceleration in the direction of first, second, and third sensing axes and generating corresponding first, second, and third acceleration signals;
a processor in operative communication with the means for sensing the accelerations, configured to:
determine a magnitude of the vector sum of the accelerations sensed in the directions of the first, second, and third sensing axes;
compare the magnitude to a first predetermined value to determine whether the vehicle is accelerating down the slope; and
generate a first output signal when the vehicle is accelerating down the slope.

20. The apparatus of claim 19, wherein the first, second, and third sensing axes are orthogonal to each other.

21. The apparatus of claim 19, wherein the first predetermined value is equal to the acceleration due to gravity.

22. The apparatus of claim 19, wherein the processor is further configured to: compare the magnitude to a second predetermined value; and
generate a second output signal when the vehicle is accelerating down the slope at a rate corresponding to the second predetermined value.

23. A lawnmower including: a frame; an engine supported by the frame;
a mower deck having a cutting blade that is driven by the engine;
at least one drive wheel that is driven by the engine; and
an acceleration sensing apparatus supported by the frame for determining when the lawnmower is accelerating down a slope, wherein the acceleration sensing apparatus is configured to generate a first output signal when the lawnmower is accelerating down the slope.

24. The lawnmower of claim 23, further including two independently controlled drive wheels and two caster wheels, wherein the first output signal actuates a wheel brake.

25. The lawnmower of claim 23, further including at least one display, wherein the at least one display indicates when the lawnmower is accelerating down the slope.

26. The lawnmower of claim 23, wherein the acceleration sensing apparatus is further configured to generate a second output signal when the lawnmower is accelerating down the slope at a rate corresponding to a second predetermined value.

27. The lawnmower of claim 23, wherein the acceleration sensing apparatus comprises:
   an acceleration sensing device including:
   a first sensing axis;
   a second sensing axis, wherein the second sensing axis is offset from the first sensing axis; and
   a third sensing axis, wherein the third sensing axis is offset from the first and second sensing axes;
   wherein the acceleration sensing device is configured to:
      sense an acceleration in a direction of the first sensing axis and generate a corresponding first acceleration signal;
   sense an acceleration in a direction of the second sensing axis and generate a corresponding second acceleration signal; and
   sense an acceleration in a direction of the third sensing axis and generate a corresponding third acceleration signal; and
   a processor in operative communication with the acceleration sensing device, configured to:
   determine a magnitude of the vector sum of the accelerations sensed in the directions of the first, second, and third sensing axes;
   compare the magnitude to a first predetermined value to determine whether the vehicle is accelerating down the slope; and
   generate the first output signal when the vehicle is accelerating down the slope.

* * * * *